(12) United States Patent
Abe

(10) Patent No.: US 7,183,530 B2
(45) Date of Patent: Feb. 27, 2007

(54) IMAGING DEVICE AND ELECTRONIC APPARATUS WITH THE SAME

(75) Inventor: Nobuaki Abe, Saitama (JP)

(73) Assignee: Pentax Corporation, Tokyo (JP)

( * ) Notice: Subject to any disclaimer, the term of this patent is extended or adjusted under 35 U.S.C. 154(b) by 8 days.

(21) Appl. No.: 11/028,561

(22) Filed: Jan. 5, 2005

(65) Prior Publication Data

US 2005/0145772 A1 Jul. 7, 2005

(30) Foreign Application Priority Data

Jan. 7, 2004 (JP) ............................ P2004-001909

(51) Int. Cl.
*G02B 7/04* (2006.01)

(52) U.S. Cl. .............................. 250/201.2; 250/208.1; 382/225

(58) Field of Classification Search ............. 250/201.2, 250/208.1; 382/255
See application file for complete search history.

(56) References Cited

U.S. PATENT DOCUMENTS

| 4,592,637 | A | | 6/1986 | Suda |
| 4,728,785 | A | | 3/1988 | Ohnuki et al. |
| 4,978,860 | A | * | 12/1990 | Bayley et al. ............... 250/568 |
| 5,453,784 | A | * | 9/1995 | Krishnan et al. ........... 348/348 |
| 5,796,089 | A | * | 8/1998 | Marom .................. 235/462.24 |
| 6,023,056 | A | * | 2/2000 | Fiete et al. ............... 250/201.7 |
| 6,072,529 | A | * | 6/2000 | Mutze ........................ 348/351 |
| 6,621,063 | B2 | * | 9/2003 | McQueen ................ 250/208.1 |
| 6,985,177 | B2 | * | 1/2006 | Takahashi et al. ..... 348/208.99 |

FOREIGN PATENT DOCUMENTS

| EP | 0984319 | 3/2000 |
| JP | 8-9362 | 1/1996 |
| JP | 2001-94841 | 4/2001 |
| JP | 2002-10115 | 1/2002 |
| JP | 2002-190970 | 7/2002 |
| JP | 2002-354320 | 12/2002 |

OTHER PUBLICATIONS

English Language Abstract of JP 2001-94841.
English Language abstract JP 2002-190970.
English Language abstract JP 2002-10115.
English Language abstract JP 2002-354320.
English Language abstract JP 8-9362.

* cited by examiner

*Primary Examiner*—Thanh X. Luu
*Assistant Examiner*—Stephen Yam
(74) *Attorney, Agent, or Firm*—Greenblum & Bernstein, P.L.C.

(57) ABSTRACT

An electronic apparatus with an imaging device has a photographing optical system that forms an object image, an image pick-up device that has a photo-receiving area and generates image-pixel signals from the object image formed on the photo-receiving area. The photo-receiving area is inclined relative to a direction perpendicular to an optical axis by a given angle. The electronic apparatus has an extracting processor that extracts a focused-image from the object image as focused-image data on the basis of the image-pixel signals, a recording processor that records the focused-image data in a memory; and a displaying processor that displays the focused-image on a display in accordance with the focused-image data.

14 Claims, 19 Drawing Sheets

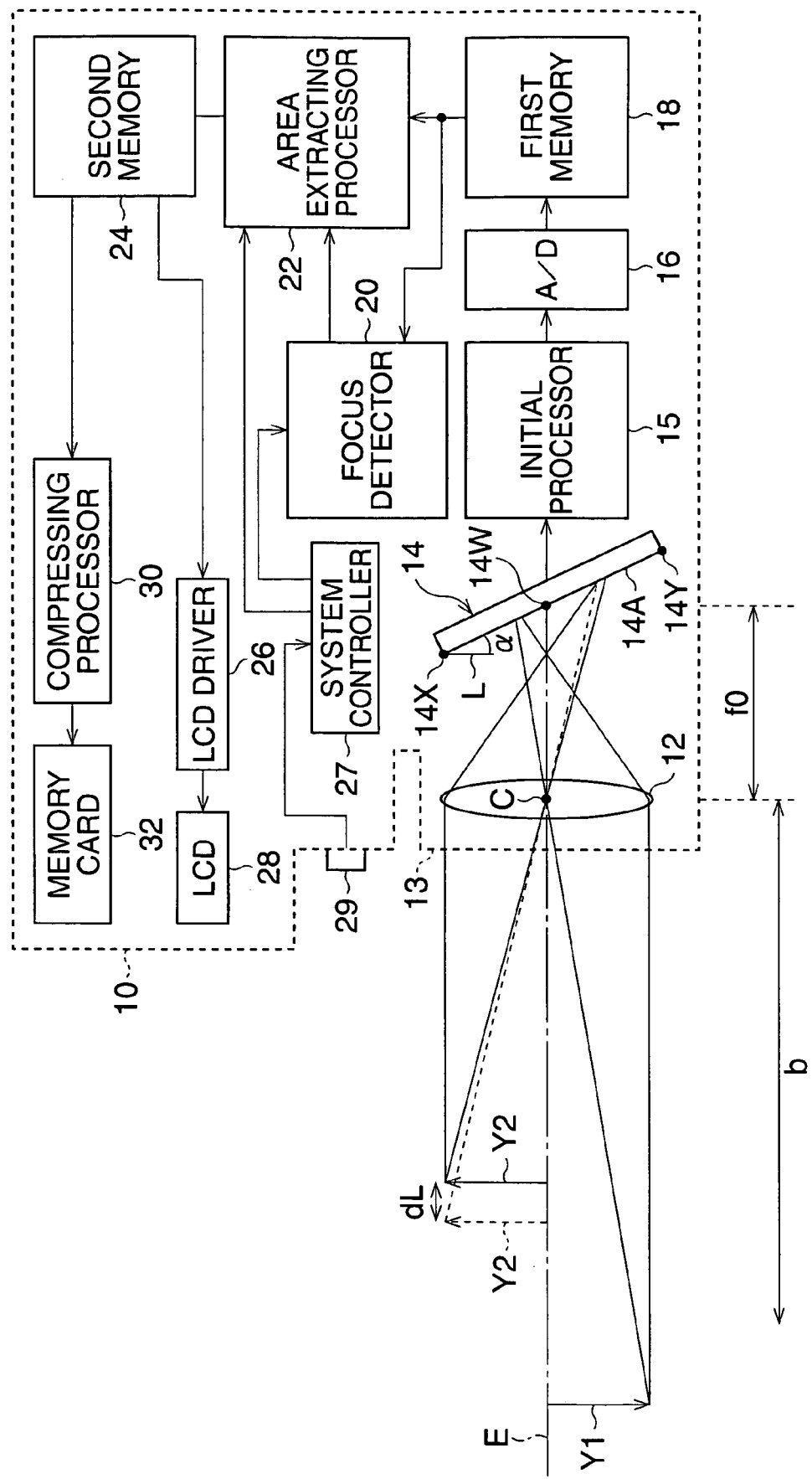

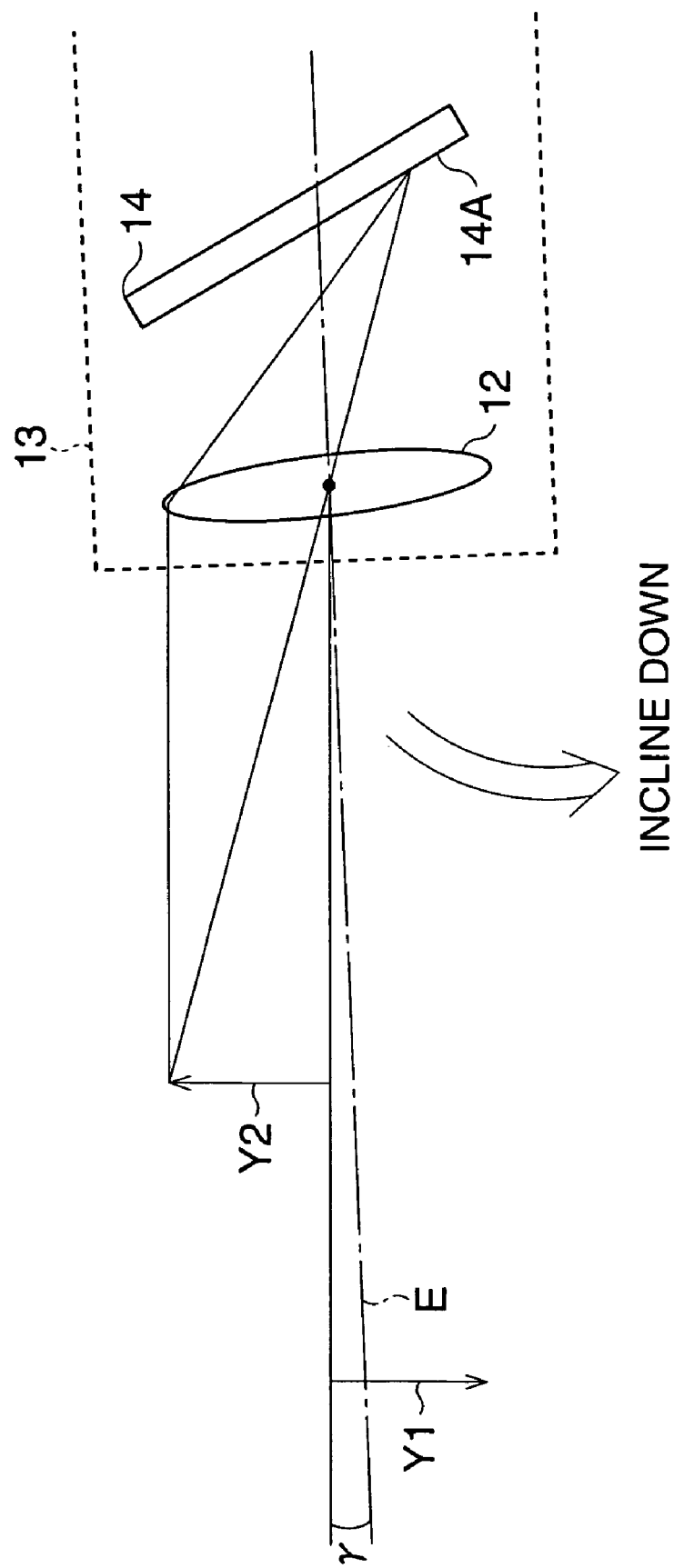

∞ : IMAGE POINT CORRESPONDING TO INFINITY

* : IMAGE POINT CORRESPONDING TO CLOSEST FOCUSING DISTANCE

\#: IMAGE POINT CORRESPONDING TO REMOTE DISTANCE

\*: IMAGE POINT CORRESPONDING TO CLOSEST FOCUSING DISTANCE

IMAGING DEVICE AND ELECTRONIC APPARATUS WITH THE SAME

BACKGROUND OF THE INVENTION

1. Field of the Invention

The present invention relates to an imaging device and an electronic apparatus with the imaging device, such as a digital still or movie camera, a digital specialized camera for security or TV conversation, a cellular phone with a camera, and so on. Especially, it relates to a focus adjustment of the imaging device.

2. Description of the Related Art

In the digital camera, a pan-focus or an auto/manual focus is performed to adjust the focus. In the case of the pan-focus, a lens with a short focus length is used, and the diameter of an iris is reduced so as to have a small F number, whereby both an object close to the camera or an object far away from the camera can be focused. On the other hand, in the case of the auto/manual focus, a focusing lens is incorporated in the camera, and a focus adjustment is performed by shifting the focusing lens along the optical axis. Further, when photographing a big and wide object such as a high building, a swing & tilt mechanism is utilized to make the entire of object in focus.

When using the pan-focus mechanism, since the focus length is short and the F number of the iris is small, the photographing conditions, such as an angle of view, are restricted. On the other hand, when using the auto/manual focus mechanism, the inner structure of the apparatus becomes complicated because of the focus adjustment mechanism, which raises the cost. Further, it is difficult to incorporate the focus adjustment mechanism in a compact and flexible electronic apparatus such as a cellular phone.

SUMMARY OF THE INVENTION

An object of the present invention is to produce an imaging device, a method for imaging, and an electronic apparatus with the imaging device such as a digital camera that is a simple and easy to construct, and is capable of obtaining a focused image.

An electronic apparatus with an imaging device according to the present invention is, for example, a digital still camera, digital movie camera, a specialized camera for security or TV conversation, an electronic endoscope, a cellular phone, and so on. The electronic apparatus has a photographing optical system that forms an object image, and an image pick-up device that has a photo-receiving area and generates image-pixel signals from the object image formed on the photo-receiving area. The image pick-up device such as a CCD is arranged such that a photo-receiving area being inclined relative to a direction perpendicular to an optical axis by a given angle. For the arrangement of the image pick-up device, the image pick-up device may be inclined relative to a direction perpendicular to the optical axis, or an optical system such as prism may be provided between the optical photographing system and the image pick-up device so that light-path is inclined to the photo-receiving area. The image pick-up device is, for example, movable or rotatable so as to change the inclined angle of the image pick-up device in use of the electronic apparatus. However, since the focused image can be necessarily obtained by set a shooting range, the image pick-up device may be fixed in an inclined situation. Also, the image pick-up device may be fixed with inclined situation while photographing a given object, and the inclined angle may be changed in accordance with the object, which is different from the photographing method using a swing & tilt mechanism.

As the photo-receiving area is not relatively parallel to a direction vertical to the optical axis, an image formed on the photo-receiving area is not totally focused, and a position of the object, which results in a focused image, varies with a position or location of the photo-receiving area. In the photo-receiving area, one end portion (first end portion) of the photo-receiving area, which is relatively close to the optical photographing system along the optical axis, corresponds to an image-point of an object at infinity or at a remote distance. In other words, an image of the object at infinity or at the remote distance is focused at the side of the first end portion. For example, the edge of the image of the object at infinity or a remote distance corresponds to the first end portion. On the other hand, the other end portion (second end portion) of the photo-receiving area, which is relatively distant from the optical photographing system along the optical axis, corresponds to an image-point of an object at a close distance or at the closest focusing distance.

Further, the electronic apparatus according to the present invention has an extracting processor, a recording processor, and a displayer. The extracting processor extracts a focused-image from the object image as focused-image data on the basis of the image-pixel signals. Therefore, the focused-image becomes a part-image of the object image formed on the photo-receiving area. The recording processor records the focused-image data in a memory. The displaying processor displays the focused-image on a display in accordance with the focused-image data. For example, the focused-image is recorded in, for example, a mobile memory card. Or the focused-image may be recorded in an exclusive memory. The focused-image is totally displayed on the display such as LCD.

As for an extracting method of the focused image, automatic extraction may be applied. For example, the extracting processor has a focus detector that detects a focused area in the object image.

On the other hand, when obtaining the focused image by manual operation, an extracting area may be defined on the photo-receiving area in advance. In this case, the extracting processor defines a first area for forming an image of a relatively distant object, and a second area for forming an image of a relatively close object. Then, the extracting processor selectively extracts one of a first object image formed on the first area and a second object image formed on the second area. Further, the extracting processor may define a remote distance area, a close distance area, and a middle distance area. In this case, the remote distance area is located at one side of said photo-receiving area, is defined for forming an image of a relatively distant object or an object at infinity, and is relatively close to said optical photographing system along the optical axis. The close distance area is located in the other side of said photo-receiving area, is defined for forming an image of an object, which is relatively close to a closed focusing distance, and is relatively distant from said optical photographing system along the optical axis. The middle distance area is located between the close distance area and the remote distance area, and includes the center point of said photo-receiving area. The extracting processor selectively extracts an object image formed one of the close, remote, and middle distance areas as the focused image data.

BRIEF DESCRIPTION OF THE DRAWINGS

The present invention will be better understood from the description of the preferred embodiment of the invention set fourth below together with the accompanying drawings, in which:

FIG. 1 is a block diagram of a digital still camera according to a first embodiment;

FIG. 5 is a view showing a light-pass where the image of the object is in focus;

DESCRIPTION OF THE PREFERRED EMBODIMENTS

Figure 2A:
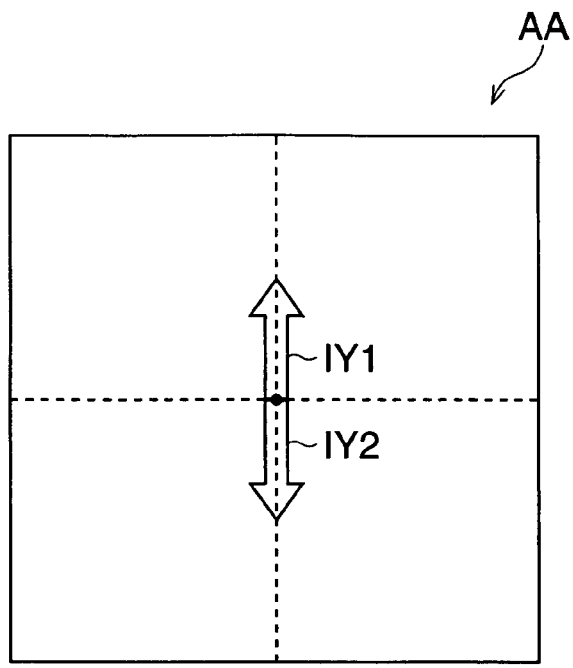
FIGS. 2A and 2B are views showing an object image formed on a photo-receiving area of a CCD.

Hereinafter, the preferred embodiments of the present invention are described with reference to the attached drawings.

FIG. 1 is a block diagram of a digital still camera according to a first embodiment.

A digital camera 10 is capable of displaying a movie image and recording a still image, and has a photographing optical system 12, a CCD 14, a system controller 27, and an LCD 28. The photographing optical system 12 is a single focus optical system without a focusing lens. The magnification of the optical photographing system 12 is set to a standard magnification (for example, less than 1/10). The system controller 27 controls the camera 10. The photographing optical system 12 is provided in a lens barrel 13 of the camera 10, and forms an object image on a photo-receiving area 14A of the CCD 14. The CCD 14 is arranged to be inclined relative to the direction L, which is perpendicular to an optical axis E of the photographing optical system 12, by a given angle α. Further, the CCD 14 is arranged such that the center of the photo-receiving area 14W passes through the optical axis E. Note that, the angle α is set to a fine angle.

The distance from the principal point "C" of the photographing optical system 12 to the center 14W is determined in accordance with the focus length f0 of the photographing optical system 12. The upper range of the photo-receiving area 14A is smaller than the focus length f0, while the under range is longer than the focus length f0. Therefore, an object that is relatively close to the camera 10 with respect to the object distance "b" is generally in focus, and an object that is relatively distant from the camera 10 with respect to the object distance "b" is generally in focus. Herein, each of arrow "Y1" that exists a long distance from the camera 10 and arrow "Y2" that exists a short distance from the camera 10 is defined as an "object". Note that, the objects "Y1" and "Y2" exist in the shooting range. The camera 10 is arranged such that both base ends of the objects "Y1" and "Y2" are on the optical axis E. The object "Y1", which is an arrow extending from the optical axis E toward a lower direction, is captured by the camera 10, while the object "Y2", which is an arrow extending from the optical axis E toward an upper direction, is captured. The object "Y1" is relatively distant from the camera 10 compared with the object "Y2".

The object image is formed on the photo-receiving area 14A by the optical photographing system 12, and image-pixel signals are generated corresponding to the object image by the photoelectric effect. The one frame worth of image-pixel signals is successively read from the CCD 14 at predetermined time-intervals. In an initial processor 15, various processes, such as an amplifying process, color adjustment process, and so on, are performed on the image-pixel signals, and the processed image-pixel signals are converted from analog signals to digital signals in an A/D converter 16. The digital image signals are temporarily stored in a first memory 18, and are fed to a focus detector 20 and an area extracting processor 22.

In the focus detector 20, a focused area (hereinafter, called as a "focused image area") among the total of the formed object image is detected on the basis of the digital image signals. In the area extracting processor 22, image data (hereinafter, called as "focused image data"), corresponding to the focused image area, is extracted in accordance with the focused image area detected in the focus detector 20, and is stored in a second memory 24. The focused image data is fed from the second memory 24 to an LCD driver 26, which drives an LCD 28 in accordance with the focused image data. Consequently, an image (hereinafter, called as an "focused image"), corresponding to the focused image area that is part of the area of the formed object image, is totally displayed on the LCD 28.

When a release button 29, provided on the camera 10, is pressed to record a still image, a shutter (not shown) and an iris (not shown) act, so that one frame worth of image-pixel signals is read from the CCD 14. The image-pixel signals are subjected to various processes in the initial processing circuit 15 and the A/D converter 16, the digital image signals are fed to the first memory 18. Then, when one frame worth of digital image signals is fed to the focus detector 20 and the area extracting processor 22, the focused image data is extracted and fed to the second memory 24. In a compressing processor 30, a compressing process is performed on the focused image data. Consequently, the compressed data, namely, the focused image is recorded in a memory card 32, which is detachably installed in the camera 10.

With reference to FIGS. 2 to 6, the photograph motion is explained.

Figure 2B:
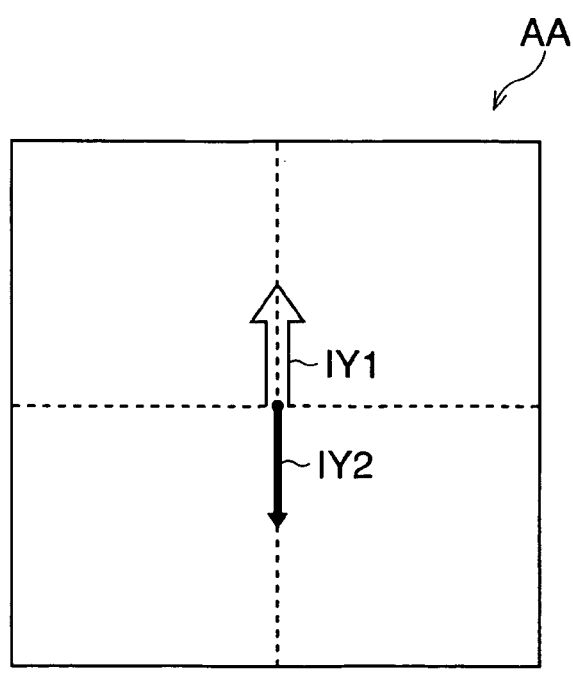

FIGS. 2A and 2B are views showing an object image formed on the photo-receiving area 14A of the CCD 14. The object image "IY1" is formed in the upper range of the photo-receiving area 14A with respect to the optical axis E as the object "Y1" is situated under the optical axis E. On the other hand, the object image "IY2" is formed in the lower range of the photo-receiving area 14A as the object "Y2" is situated above the optical axis E. Since the CCD 14 is inclined, the position of an object along the optical axis E where the image of the object is in focus, varies with the imaging-position of the photo-receiving area 14A, which is different from a CCD that is arranged along a direction vertical to the optical axis E. As the imaging-position becomes close to one end point 14X of the photo-receiving area 14A (hereinafter, called as a "first end point"), an image of an object, which is relatively far away from the camera 10 or exists at infinity from the camera 10, is in focus. While, as the position becomes close to the other endpoint 14Y (hereinafter, called as a "second end point"), an image of an object, which is relatively close to the camera 10 or is at a closest focusing distance, is in focus. Note that, the closest focusing distance depends upon the focus distance f0 of the optical photographing system.

When the objects "Y1" and "Y2" is situated as shown in FIG. 1, the object image "Y1" and "Y2" are not formed on the photo-receiving area 14A, so that displayed recorded object images "IY1" and "IY2" are out of focus and become unclear images. FIG. 2A indicates an image "AA" (hereinafter, called a "total object image") that is formed on the photo-receiving area 14A and is stored in the first memory 18. When the object "Y2" moves along the optical axis E by a given distance "dL" so as to be relatively distant from the camera 10, the object "Y2" is situated in the focused position, and the object image IY2 is in focus (See FIG. 2B). Note, although the object "Y2" extends along the vertical direction L while the CCD 14 is inclined, most of the object image "IY2" is substantially in focus because of the fine angle α of the CCD 14 and the standard image magnification of the optical photographing system 12. In this embodiment, the user adjusts the direction of the optical axis E while inclining the camera 10, to extract an object image that the user wants to capture as a "focused image".

Figure 3:
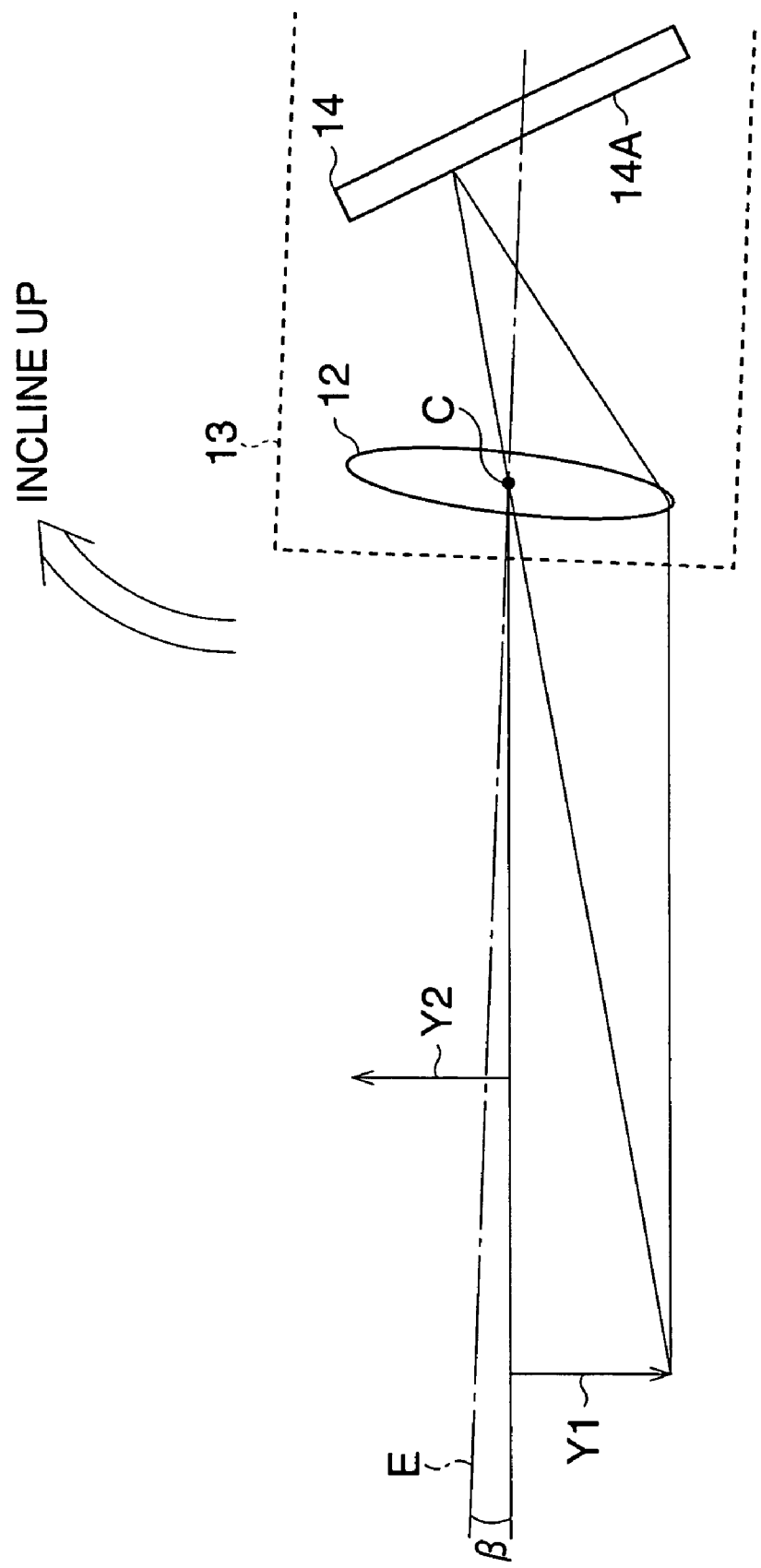
FIG. 3 is a view showing a light-pass where the image of the object is in focus.
Figure 4A:
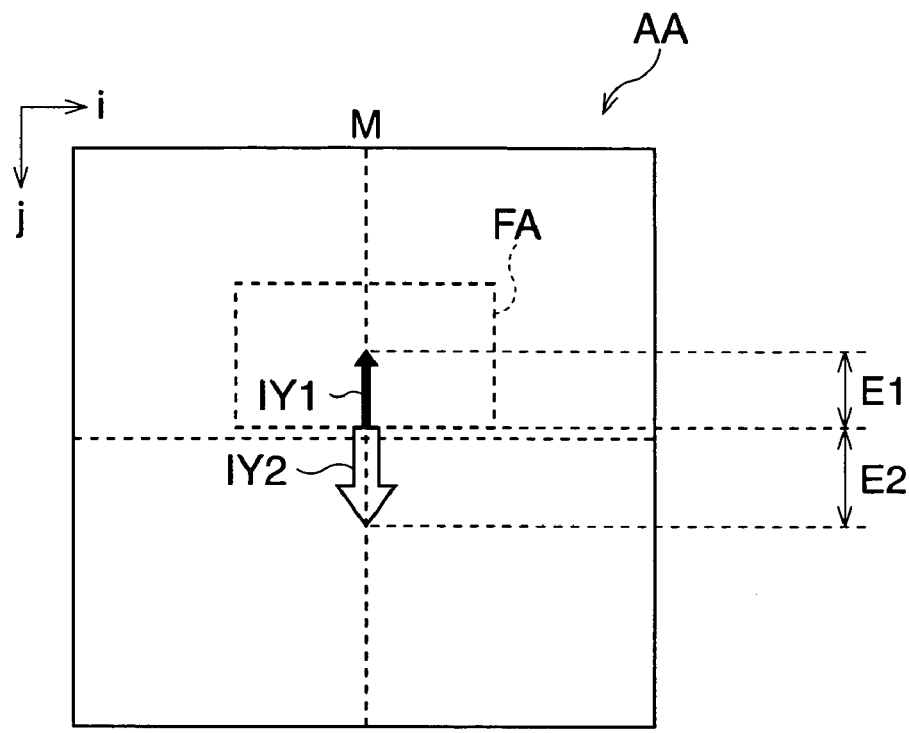
FIGS. 4A and 4B are views showing a total image of the object captured by the optical photographing system, and a displayed image of the captured object.
Figure 4B:
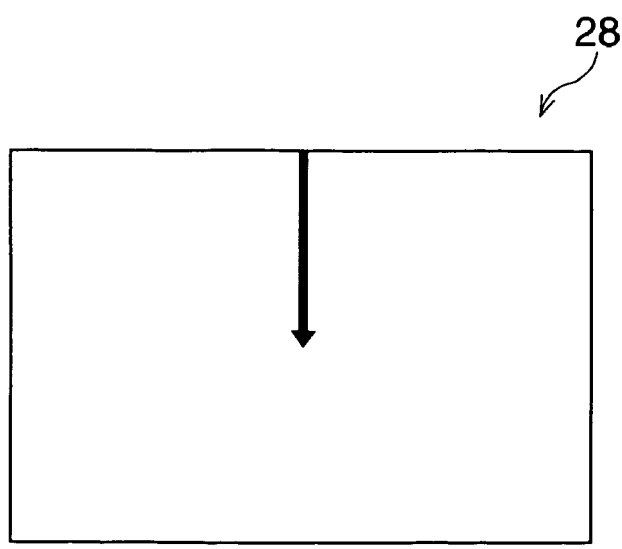
Figure 6A:
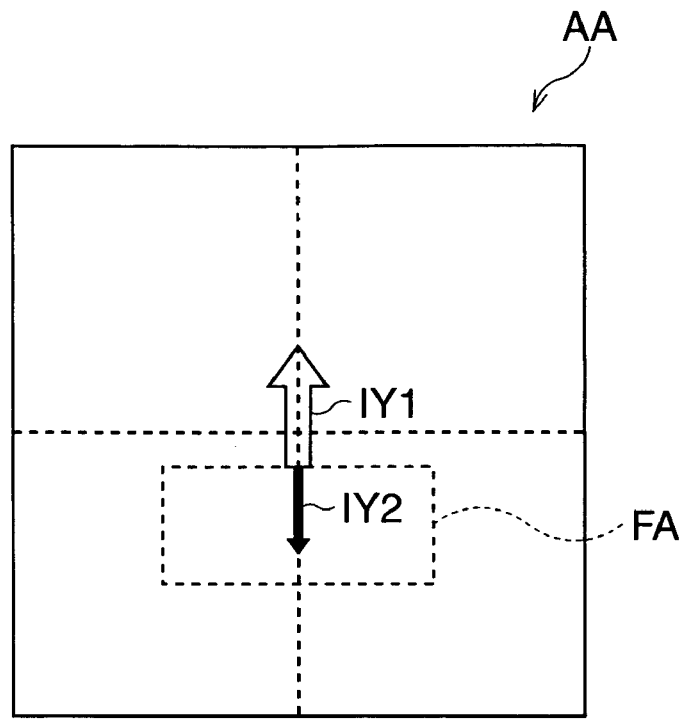
FIGS. 6A and 6B are views showing a total image of the object captured by the optical photographing system, and a displayed image of the captured object.
Figure 6B:
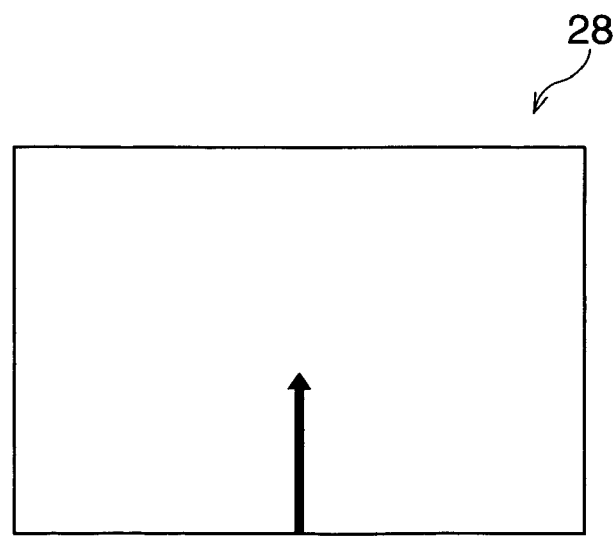

FIG. 3 is a view showing a light-path where the image of the object "Y1" is in focus. FIG. 4A is a view showing a total image of the object "Y1" captured by the optical photographing system 12. FIG. 4B is a view showing a displayed image of the object "Y1". FIG. 5 is a view showing a light-path where the image of the object "Y2" is in focus. FIG. 6A is a view showing a total image of the object "Y2" captured by the optical photographing system 12. FIG. 6B is a view showing a displayed image of the object "Y2".

When inclining the camera 10 up from the situation shown in FIG. 1 by a given angle β, an image of the object "Y1" is formed on the photo-receiving area 14A (See FIG. 3). Thus, the focused object image "IY1" is formed in the total object image AA stored in the first memory 18 (See FIG. 4A). In the focus detector 20, a focused area is detected from the total object image AA by a contrast detecting method. Herein, high frequency components in the digital image signals, namely, contrast are detected along the "j" direction corresponding to a sub-scanning line (lengthwise direction). The amplitudes of the image signal waves are a maximum at the focused position, while their amplitudes at the adjacent (in front and behind) unfocused positions are smaller. Therefore, when detecting the high-frequency components of the image signals along the "M" line, the amplitude becomes maximum in the section "E1", while the amplitude in the section "E2" is relatively small compared to the section "E1" (See FIG. 4A).

Based on the frequency components, the focused image area "FA" that has a relatively large amplitude of the high frequency components is defined. Then, control signals for extracting the focused image area are fed from the focus detector 20 to the area extracting processor 22. In the area extracting processor 22, image signals corresponding to the focused image area "FA" are extracted, and are stored in the second memory 24. Thus, the image of the focused image area "FA" is displayed on the LCD 28 (See FIG. 4B). The size of the focused image area FA corresponds to that of the LCD 28.

When inclining the camera 10 down from the situation shown in FIG. 1 by a given angle γ, the image of the object "Y2", which is relatively close to the camera 10, is formed on the photo-receiving area 14A (See FIG. 5). Thus, the focused object image "IY2" is formed in the total object image "AA" stored in the first memory 18 (See FIG. 6A). Then, the focused image area "FA" is extracted from the total object image "AA", and the focused image corresponding to the focus area "AA" is stored in the second memory 24 and is displayed on the LCD 28 (See FIG. 6B).

In this way, in the present embodiment, the focus detector 20 and the area extracting processor 22 are provided in the camera 10, and the CCD 14 is inclined relative to the direction L vertical to the optical axis E. Then, the image of an object to be recorded and displayed is formed on the CCD 14 by inclining the camera 10 as a focused object image. Note that, an inclining adjustment mechanism may be provided in the camera 10. In this case, the user adjusts the angle of the CCD 14.

Figure 7:
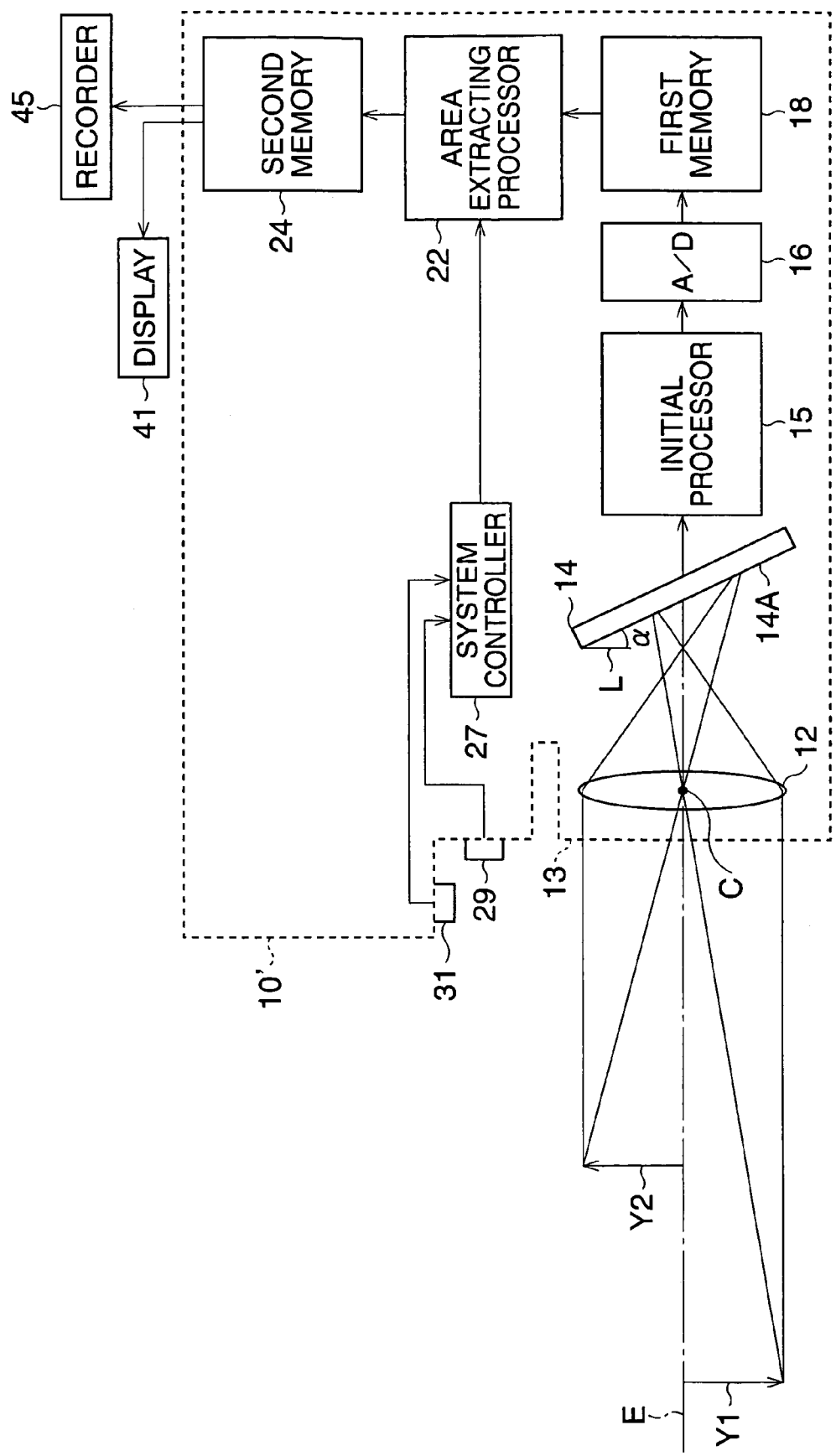
FIG. 7 is a block diagram of an imaging device according to a second embodiment.
Figure 8:
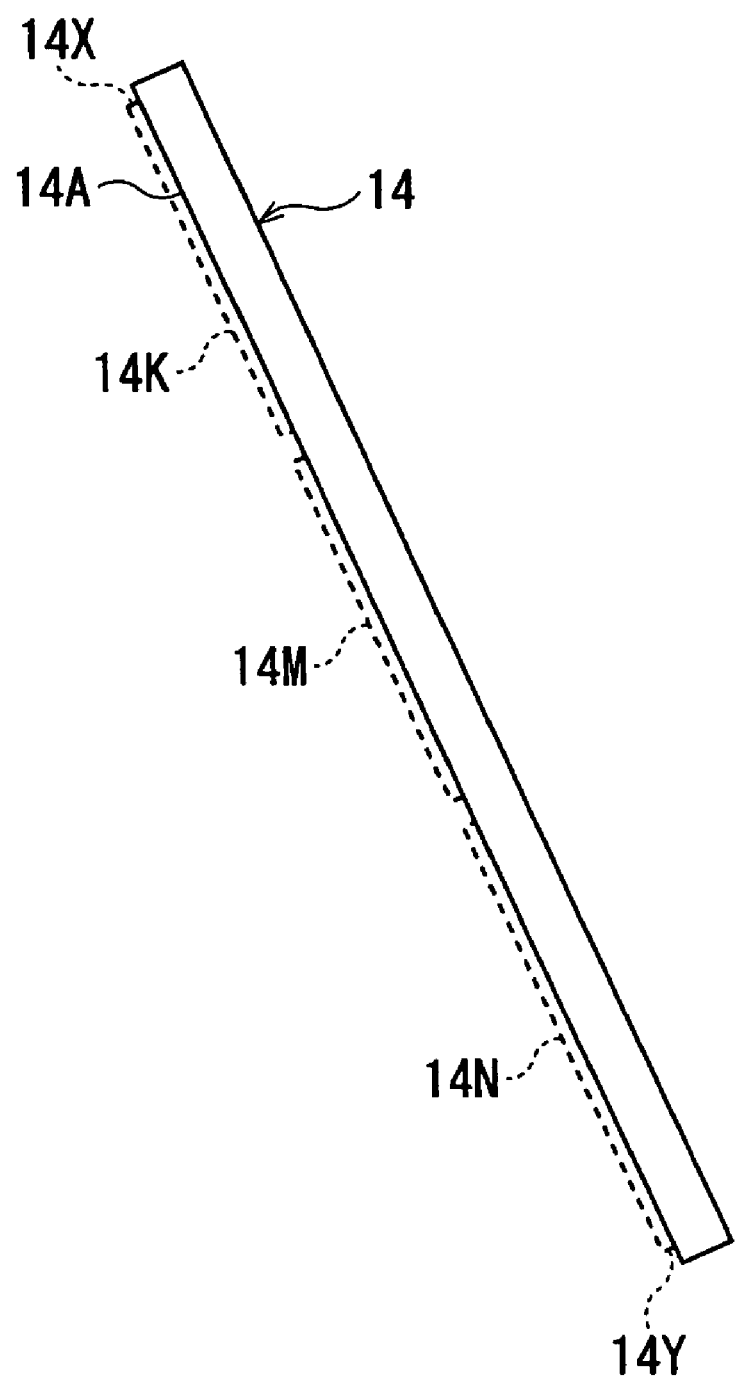
FIG. 8 is a view showing a photo-receiving area of a CCD according to the second embodiment.

With reference to FIGS. 7 and 8, the second embodiment is explained. The second embodiment is different from the first embodiment in that an area extracted from the total object image is defined in advance.

FIG. 7 is a block diagram of an imaging device according to the second embodiment. FIG. 8 is a view showing a photo-receiving area of a CCD according to the second embodiment.

The imaging device 10' is a device for outputting image signals to peripheral apparatus. Herein, the imaging device 10' is connected to a display 41, and a recorder 45. The imaging device 10' has an area extracting processor 22 and a second memory 24. The system controller 27 controls the imaging device 10'. Note that, the numbers assigned to the members or processor elements in the imaging device 10' are the same as the corresponding members or processor elements in the first embodiment.

In the CCD 14, plural extracting areas are defined on the photo-receiving area 14A in advance. Namely, an upper extracting area 14K for an object that is relatively remote from the camera 10, a lower extracting area 14N for an object that is relatively close to the camera 10, and a middle extracting area 14M for an object that is between the distant object and the close object, are respectively defined. An object distance switch 31 is operated for selecting an extracting area from the three extracting areas 14K, 14M, and 14N. The user selects one of the three extracting areas 14K, 14M, and 14N by operating the object distance switch 31. The user inclines the camera 10 up or down to incline the optical axis E, such that an image of an object to be displayed is formed on the selected extracting area in a focused situation.

The image-pixel signals are successively read from the CCD 14, and the focused image data corresponding to the selected extracting area is extracted in the area extracting processor 22, and is further fed to the second memory 24 and the display 41.

The user inclines the camera 10 up or down to adjust the inclined angle of the CCD 14, while confirming whether the image of the object to be displayed and recorded is in focus via the display of the LCD 28. When the recording switch 29 is operated, the focused image data is transmitted to the recorder 45.

With reference to FIGS. 9 to 19, the minimum inclined angle of the CCD is explained. Hereinafter, the CCD is arranged such that the photo-receiving area is as close as possible to a direction vertical to the optical axis.

In FIGS. 9 to 14, an object at infinity and an object at the closest focusing distance are considered, whereas, in FIGS. 15 to 19, an object at the remote distance and an object at the closest focusing distance are considered.

Figure 9:
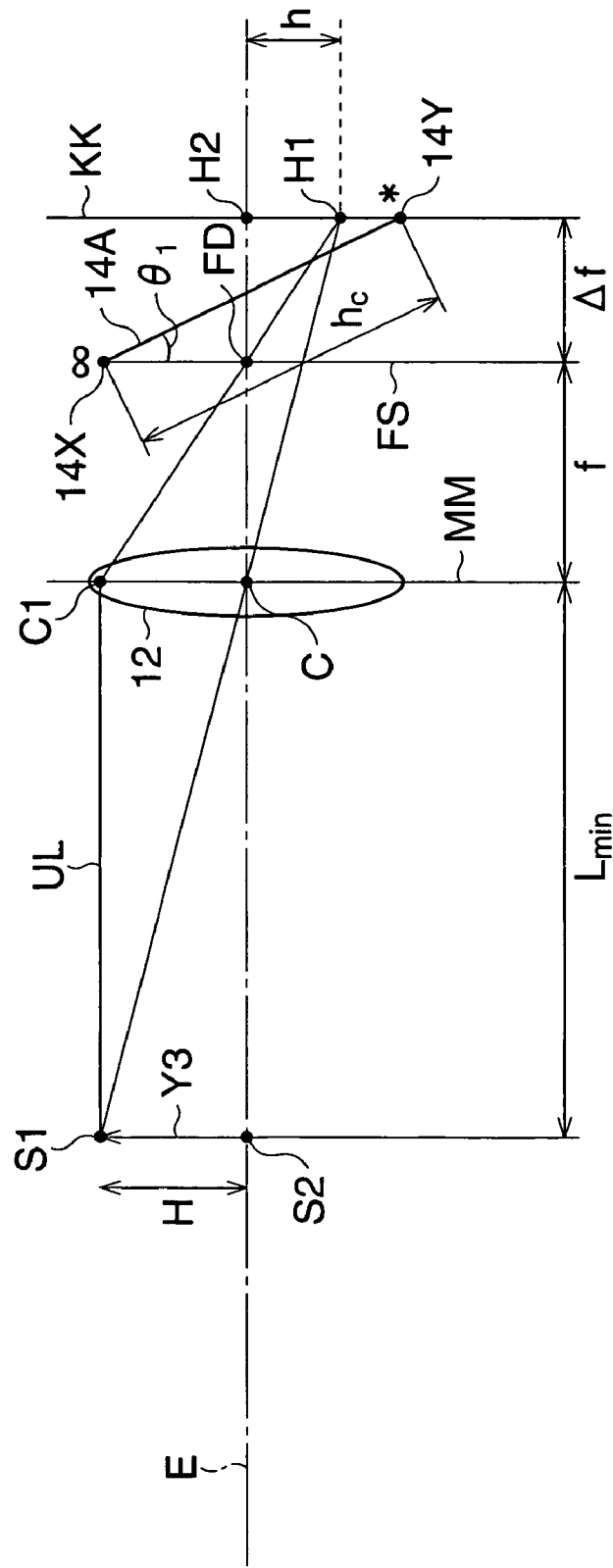
FIG. 9 is a view showing an arrangement of a CCD according to a third embodiment.

With reference to FIG. 9, an imaging device according to the third embodiment is explained. In the third embodiment, the minimum inclined angle condition is calculated. Note that, a circle of confusion is not considered. The construction of the imaging device is the same as that in the first embodiment.

FIG. 9 is a view showing an arrangement of the CCD according to the third embodiment.

The first end point 14X of the photo-receiving area 14A corresponds to an image-point of an object at infinity. The second end point 14Y corresponds to an image-point of an object positioned on a closest focusing distance. Herein, the inclined angle is calculated in a condition that an image of an object in the shooting range (from the closest focusing distance to the infinity) is focused in a part-area of the photo-receiving area 14A.

In FIG. 9, a focus distance is designated by "f"; a distance from the first end point 14X to the second end point 14Y along the optical axis E, is designated by "Δf"; a height of an object Y3 from the optical axis E is designated by "H"; a cross point of the object Y3 and the optical axis E is designated by "S2"; the top point of the object "Y3" is designated by "S1"; and the principle point of the optical photographing system 12 is designated by "C". An imaging plane of the object Y3 at the closest focusing distance is designated by "KK", the image-point at the top point S1 of the object Y3 is designated by "H1", and the cross point of the imaging plane KK and the optical axis E is designated by "H2".

The cross point of the principle plane "MM", which passes the principle point "C" and is vertical to the optical axis E, and the upper limit ray, which is directed from the top point "S1" of the object "Y3", is designated by "C1". The cross point of the optical axis E and the upper limit ray UL is designated by "FD", the distance from the optical axis E (from the cross point H1) to the image-point H1 is designated by "h", and the closest focusing distance that is a distance from the principle point "C" to the object "Y3" is designated by "$L_{min}$". The first end point "14X" is positioned on a focal plane "FS", and the inclined angle of the CCD 14 is herein represented by "$\theta_1$".

As the triangle composed of the vertices "C", "S1", "S2", is similar to the triangle composed of vertices "C", "H1", "H2", the following formula is satisfied.

$$H/L_{min}=h/(f+\Delta f) \quad (1)$$

Then, as the triangle composed of vertices "C", "C1", "FD" is similar to the triangle composed of vertices "H2", "H1", "FD", the following formula is satisfied.

$$H/f=h/\Delta f \quad (2)$$

Based on the formulae (1) and (2), the distance "Δf" is calculated by the following formula.

$$\Delta f = f^2/(L_{min}-f) \quad (3)$$

When the effective length of the photo-receiving area 14A is represented by "$h_c$", the inclined angle "$\theta_1$" satisfies the following formula.

$$\sin \theta_1 = \Delta f/h_c \quad (4)$$

Based on the formula (4), the inclined angle "$\theta_1$" is calculated by the following formula.

$$\theta_1 = \sin^{-1}(\Delta f/h_c) \quad (5)$$
$$= \sin^{-1}((1/h_c) \times f^2/(L_{min}-f))$$

When inclining the CCD 14 by an angle more than the angle "$\theta_1$", the image of the object at infinity and the image of the object at closest focusing point is necessarily formed on the photo-receiving area 14A having the effective length "$h_c$". Therefore, the focused image can be recorded and displayed by inclining the CCD 14 by at least the inclined angle "$\theta_1$".

Figure 10:
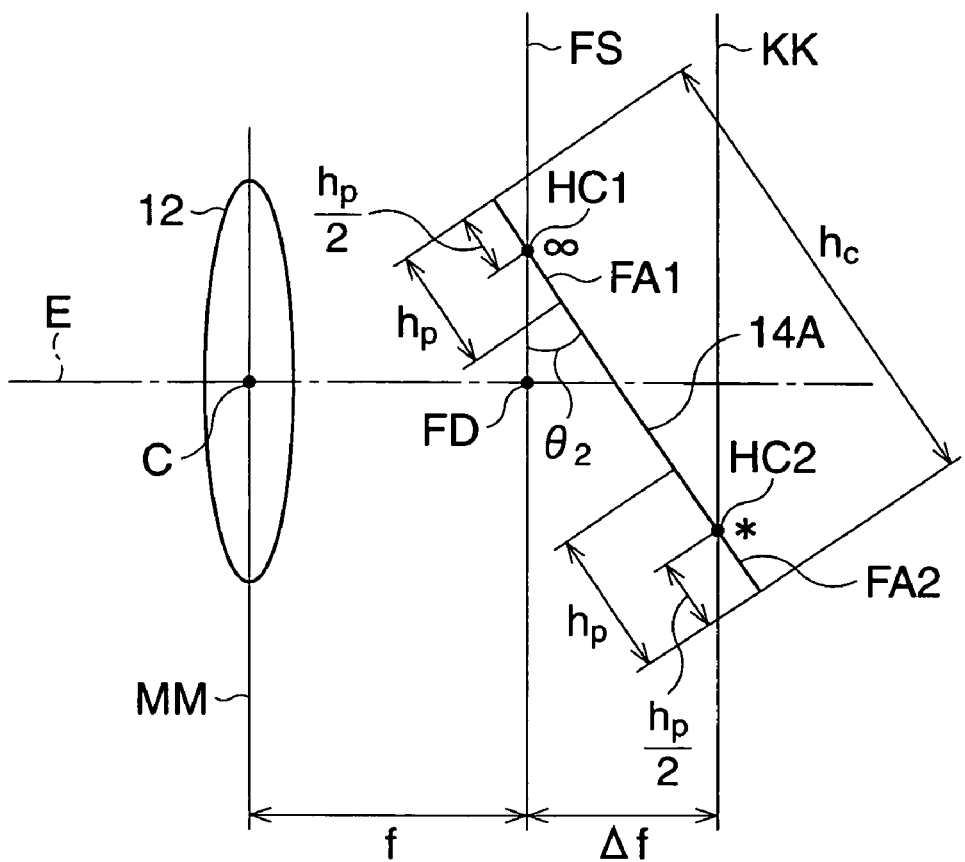
FIG. 10 is a view showing an arrangement of a CCD according to a fourth embodiment.

With reference to FIG. 10, an imaging device according to the fourth embodiment is explained. In the fourth embodiment, extracting areas are defined on the photo-receiving area, similarly to the second embodiment, and a center of one extracting area is defined as an image-point of an object at infinity, while a center of the other extracting area is designed as an image-point of an object at the closest focusing distance. The construction of the imaging device is the same as that of the second embodiment shown in FIGS. 7 and 8. Note that, a circle of confusion is not considered.

FIG. 10 is a view showing an arrangement of the CCD according to the fourth embodiment. The upper extracting area and the lower extracting area shown in the second embodiment (FIG. 8) are, herein, respectively designated by "FA1" and "FA2". A center point of the extracting area FA1 corresponds to an image-point of an object at infinity, and a center point of the extracting area FA2 corresponds to an image-point of an object at the closest focusing distance. Thus, sharpness and contrast of the image is uniformed in each extracting area, and contrast of the image along the longitudinal direction has symmetry with respect to the center point.

A length of the extracting areas FA1 and FA2 is designated by "$h_p$", the center points of the extracting areas FA1 and FA2 are respectively designated by "HC1" and "HC2", and the inclined angle of the CCD 14 is designated by "$\theta_2$". The inclined angle "$\theta_2$" satisfies the following formula in place of the formula (4).

$$\sin \theta_2 = \Delta f/(h_c - 2 \times h/2) = \Delta f/(h_c - h_p) \quad (6)$$

Therefore, the inclined angle "$\theta_2$" is calculated by the following formula.

$$\theta_2 = \sin^{-1}(\Delta f/(h_c-h_p)) \quad (7)$$
$$= \sin^{-1}(1/(h_c-h_p) \times f^2/(L_{min}-f))$$

Figure 11:
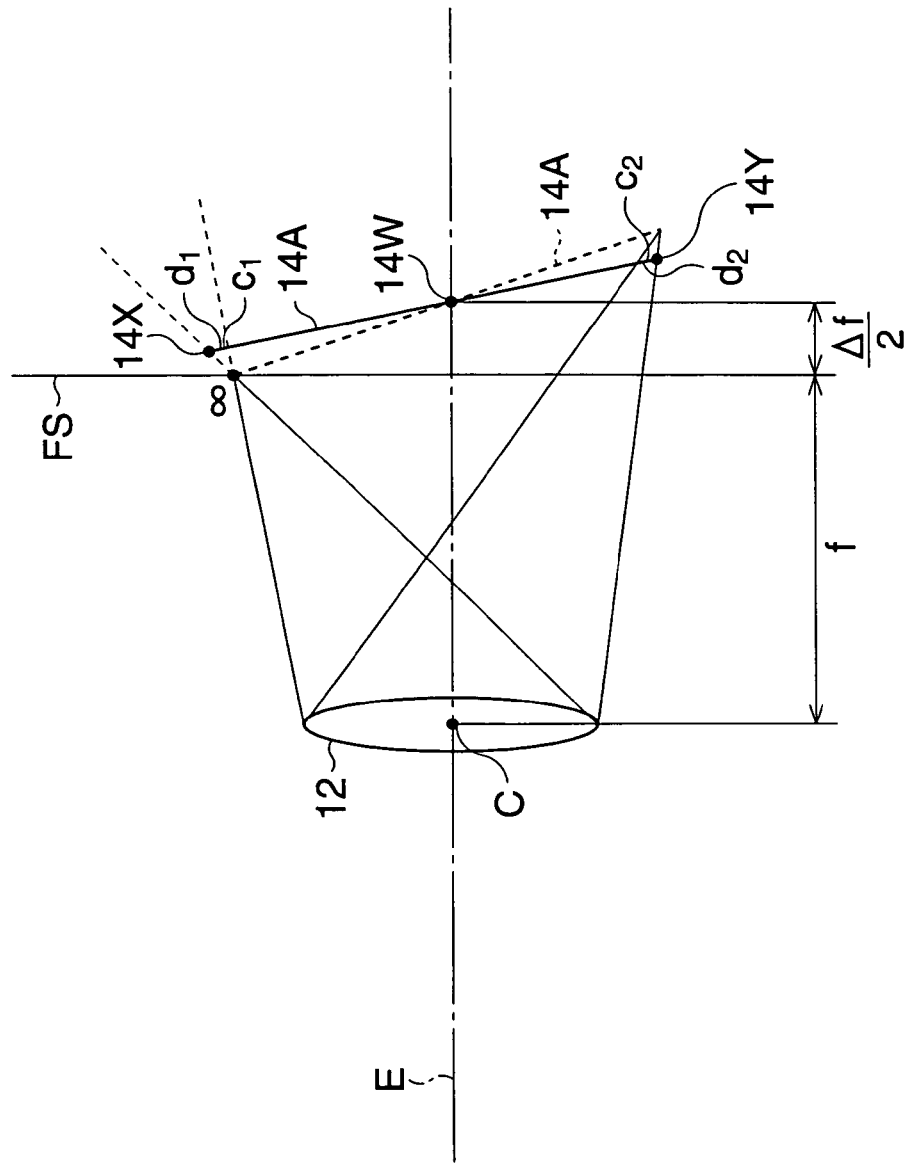
FIG. 11 is a view showing an arrangement of a CCD according to a fifth embodiment.
Figure 12:
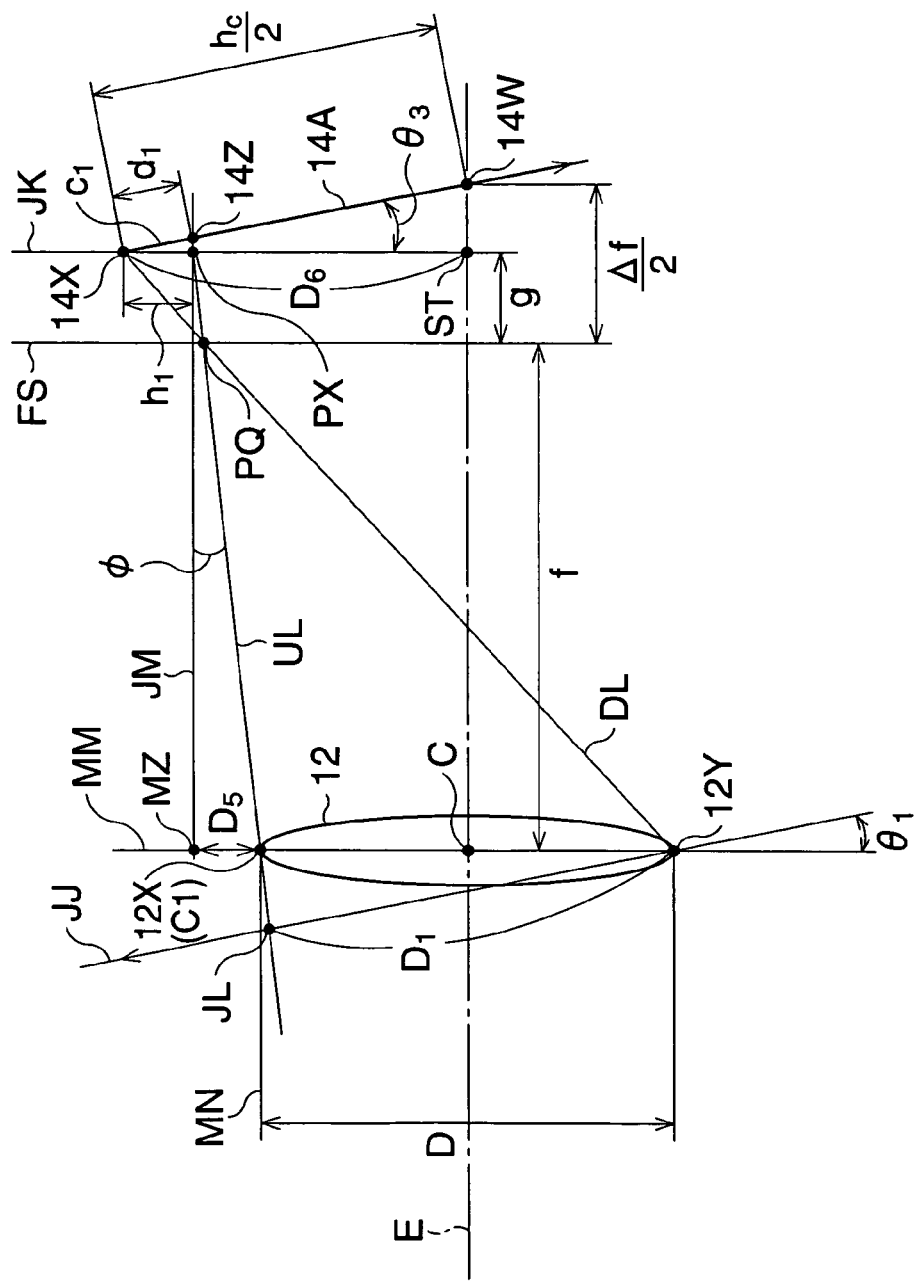
FIG. 12 is a view showing an upper portion of the CCD where a circle of confusion associated with an object at infinity is formed.
Figure 13:
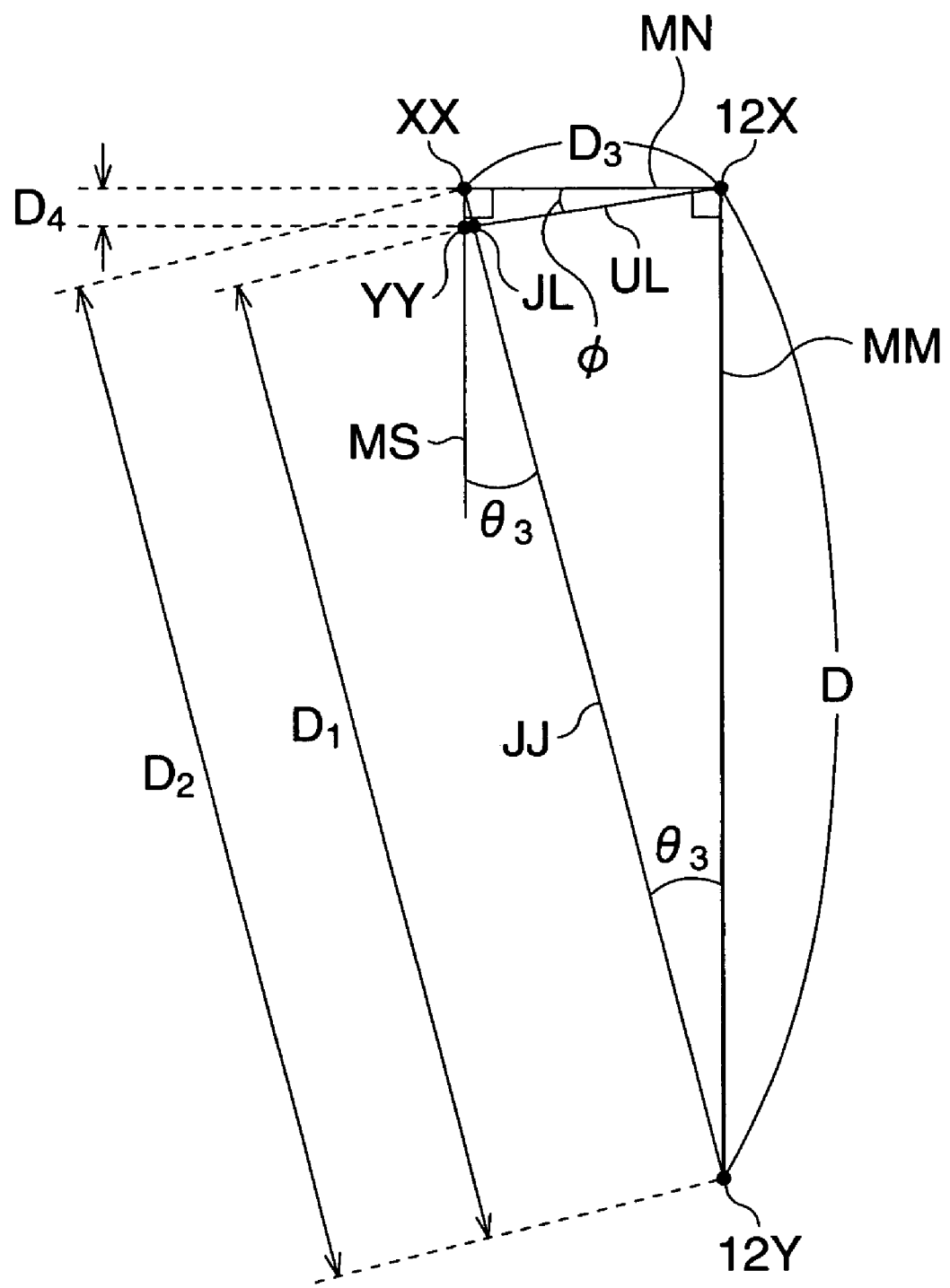
FIG. 13 is a magnified view of the optical photographing system shown in FIG. 12.

With reference to FIGS. 11 to 13, an imaging device according to the fifth embodiment is explained. In the fifth embodiment, based on a permissible circle of confusion, the minimum inclined angle condition is calculated. Note that, the position of the photo-receiving area is arranged so as to be distant from the focal plane by a given length along the optical axis. The construction of the imaging device is the same as that of the first embodiment.

FIG. 11 is a view showing an arrangement of the CCD in a condition where a permissible circle of confusion is considered. FIG. 12 is a view showing an upper portion of the CCD where the circle of confusion associated with an object at infinity is formed. FIG. 13 is a magnified view of the optical photographing system shown in FIG. 12. Firstly, one end point of the photo-receiving area is defined as an image-point corresponding to infinity, while the other end point is defined as an image-point corresponding to the closest focusing distance. Then, the minimum inclined angle condition is calculated as follows, based on the permissible circle of confusion, an image of which is visually acceptable as a sharp image, in other words, based on the depth of focus.

In FIG. 11, the arrangement of the CCD 14 in a condition where the image-point of the object at infinity corresponds to the first end point 14X and the image-point of the object at the closest focusing distance corresponding to the second end point 14Y, is shown by a broken arrow. Further, in FIG. 11, two circles of confusion "$c_1$" "$c_2$", which are formed by changing the position (posture) of the CCD 14 toward the vertical direction to the optical axis E, is shown. A radius of the circle of confusion "$c_1$", adjacent to the first end point 14X, is designated by "$d_1$", while a radius of the circle of confusion "$c_2$", adjacent to the second end point 14Y, is designated by "$d_2$". Hereinafter, the inclined angle condition where the radiuses "$d_1$" and "$d_2$" of the circles of confusion are equal to or less than radiuses of a permissible circle of confusion, is calculated. Note that, the CCD 14 is arranged such that the center point 14W of the photo-receiving area 14A is distant from the focus point by "$\Delta f/2$" along the optical axis E. When the center point 14W is distant from the focus point by $\Delta f/2$, the radius "$d_1$" of the circle of confusion "$c_1$" is larger than the radius "$d_2$" of the circle of confusion "$c_2$" ($d_1 > d_2$). Therefore, the inclined angle condition where the radius "$d_1$" is equal to or less than the radius of the permissible circle of confusion, is calculated hereinafter.

As shown in FIG. 12, an inclined angle of the photo-receiving area 14A is designated by "$\theta_3$", the effective radius of the optical photographing system 12 is designated by "D", a distance from the focal plane FS to the first end point 14X along the optical axis E is designated by "g", and an angle between the upper limit ray UL and the optical axis E is designated by "$\phi$". Further, a cross point of the upper limit ray UL and the photo-receiving area 14A is designated by "14Z", an upper limit point, which is the cross point of the upper limit ray UL and the principle plane MM, is designated by "12X", and a lower limit point, which is the cross point of the principle plane MM and the lower limit ray DL, is designated by "12Y". Then, a parallel line, which is parallel to the photo-receiving area 14A and passes through the lower limit point 12Y, is designated by "JJ", the cross point of the upper limit ray UL and the parallel line JJ is designated by "JL", the Distance from the lower limit point 12Y and the cross point JL is designated by "$D_1$", a straight line, which passes through the first end point 14X and is vertical to the optical axis E, is designated by "JK".

When a cross point of the upper limit ray UL and the lower limit ray DL is designated by "PQ", the triangle composed of vertices "JL", "12Y", PQ" is similar to the triangle composed of vertices "14Z", "14X", "PQ". Therefore, the following formula is obtained.

$$d_1 : D_1 = g : f \quad (8)$$

Based on the formula (8), the radius "$d_1$" of the circle of confusion "$c_1$" is calculated by the following formula.

$$d_1 = g/f \times D_1 \quad (9)$$

Further, as shown in FIG. 13, a cross point of a straight line MN, which passes through the upper limit point 12X and is parallel to the optical axis E, and a parallel line JJ is designated by "XX", then, a cross point of a straight line MS, which passes through the cross point XX and is parallel to the principle plane "MM", and the upper limit point UL is designated by "YY". The distance from the lower limit point 12Y to the cross point XX on the straight line JJ is designated by "$D_2$", the distance from the upper limit point 12X to the cross point XX on the straight line MN is designated by "$D_3$", and the distance from the cross point XX to the cross point YY on the straight line MS is designated by "$D_4$". In this case, the following formulae are satisfied.

$$D_2 = D/\cos \theta_3 \quad (10)$$

$$D_3 = D\tan \theta_3 \quad (11)$$

$$D_4 = D_3 \tan \phi \quad (12)$$

On the other hand, since the triangle composed of vertices "JL", "XX", "YY" is similar to the triangle composed of vertices "JL", "12Y", "12X", the following formula is satisfied.

$$D : D_4 = D_1 : (D_2 - D_1) \quad (13)$$

Based on the formula (13), the distance $D_1$ is obtained by the following formula.

$$D_1 = D/(\sin \theta_3 \times \tan \phi + \cos \theta_3) \quad (14)$$

The radius "$d_1$" is obtained by substituting the formula (9) for the formula (14).

$$d_1 = (gD/f) \times 1/(\sin \theta_3 \times \tan \phi + \cos \theta_3) \quad (15)$$

When a cross point of the upper limit ray UL and a straight line JK vertical to the optical axis E is designated by "PX", the distance from the cross point PX to the first end point 14X on the straight line JK is designated by "$h_1$", the triangle composed of vertices "PQ", "12Y", "12X" is similar to the triangle composed of vertices "PQ", "14X", "PX". Therefore, the following formula is satisfied.

$$h_1 : D = g : f \quad (16)$$

Based on the formula (16), the distance "$h_1$" is obtained by the following formula.

$$h_1 = (g/f) \times D \quad (17)$$

Further, a straight line, which is parallel to the optical axis E and passes through the cross point PX, is designated by "JM", and the distance from a cross point "MZ", which is a cross point of the principle plane MM and the straight line JM, to the upper limit point 12X is designated by "$D_5$" (See FIG. 12). In this case, the angle "$\phi$" satisfies the following formula.

$$\tan \phi = D_5/(f+g) \quad (18)$$

On the other hand, when a cross point of the straight line JK and the optical axis E is designated by "ST", the distance "$D_6$" from the first end point 14X to the cross point ST satisfies the following formula.

$$D_6 = D_5 + D/2 + h_1 = (h_c/2) \times \cos \theta_3 \quad (19)$$

Therefore, the distance "$D_5$" is obtained by the following formula.

$$D_5 = (h_c/2) \times \cos \theta_3 - h_1 - D/2 \quad (20)$$

The angle "tan φ" is obtained by substituting the formula (20) for the formula (18) as follows.

$$\tan \phi = ((h_c/2) \times \cos \theta_3 - h_1 - D/2)/(f+g) \quad (21)$$

Further, the angle "tan φ" is represented by substituting the formula (17) for the formula (21) as follows.

$$\tan \phi = ((h_c/2) \times \cos \theta_3 - gD/f - D/2)/(f+g) \quad (22)$$

Since the distance Δf is obtained by the formula (3), the following formula is obtained by substituting the formulae (3) and (20) for the formula (15).

$$\sin \theta_3 \times (h_c/2 \times \cos \theta_3 - D(g/f+1/2))(f+g) + \cos \theta_3 = gD/fd_1 \quad (23)$$

Based on the triangle composed of vertices "14X", "14W", "ST", the distance "g" and the distance "Δf" satisfies the following formula.

$$g = (\Delta f - h_c \times \sin \theta_3)/2 \quad (24)$$

Therefore, the following formula is obtained by substituting the formula (24) for the formula (23).

$$K + L = M \quad (25)$$

Note, $$K = (D/fd_1) \times (h_c \sin^2 \theta_3 - 2\Delta f \times h_c \sin \theta_3 + \Delta f^2)/4$$

$$L = ((1/d_1 + \sin \theta_3/f) \times D - \cos \theta_3) \times (\Delta f - h_c \sin \theta_3)/2$$

$$M = \sin \theta_3 \ (h_c \cos \theta_3 - D)/2 + f \cos \theta_3$$

Since the incline angle "$\theta_3$" of the CCD 14 is a fine angle, the following formula is satisfied.

$$\cos \theta_3 \approx 1, \sin^2 \theta \approx 0 \quad (26)$$

Therefore, based on the formulae (25) and (26), the inclined angle "$\theta_3$" is obtained by the following formula.

$$\theta_3 = \sin^{-1}((\Delta f/2 - d_1 f/D)(2f + \Delta f)/((h_c - d_1)(f + \Delta f))) \quad (27)$$

Note that, the distance Δf is obtained by the formula (3). Further, The maxim value of the radius "$d_1$" of the circle of confusion, namely, the radius of the permissible circle of confusion depends upon the characteristics of the optical photographing system 12, the number of pixels and the size of the CCD 14, and so on.

The inclined angle $\theta_3$ indicates a minimum inclined angle. Namely, when positioning the CCD 14 by an inclined angle less than the angle $\theta_3$, a circle of confusion, which has a radius greater than that of the permissible circle of confusion, occurs.

For example, when the effective length "$h_c$" of the photo-receiving area 14A is 5.4 mm, the focus distance "f" is 5.4 mm, the closest focusing distance "$L_{min}$" is 300.0 mm (remote distance=∞), the F. Number of the optical photographing system "f/D" is 2.8, and the maximum value of the radius "$d_1$" of the circle of confusion "$c_1$", namely, the radius of the permissible circle of confusion is 0.009 mm, the inclined angle "$\theta_3$" is obtained by the formula (27).

$$\theta_3 = 0.5117° \quad (28)$$

Note that, the radius "$d_1$" is defined in a condition where the number of pixels along one line is 1800, and the pitch of pixels is 3 μm.

Next, an imaging device according to the sixth embodiment is explained without a figure. In the sixth embodiment, a permissible circle of confusion is considered. Further, similarly to the fourth embodiment shown in FIG. 10, extracting areas are defined on the photo-receiving area. The inclined angle in a condition that the center of one extracting area corresponds to the circle of confusion formed by an object at the closest focusing distance is calculated. Other constructions of the imaging device are the same as those of the fifth embodiment.

When the inclined angle is designated by "$\theta_4$" the inclined angle "$\theta_4$" is obtained by using "$(h_c - h_p)$" in place of "$h_c$", similarly to the fourth embodiment.

$$\theta_4 = \sin^{-1}(((\Delta f/2 - d_1 f/D)(2f + \Delta f))/((h_c - h_p - d_1)(f + \Delta f))) \quad (29)$$

Figure 14:
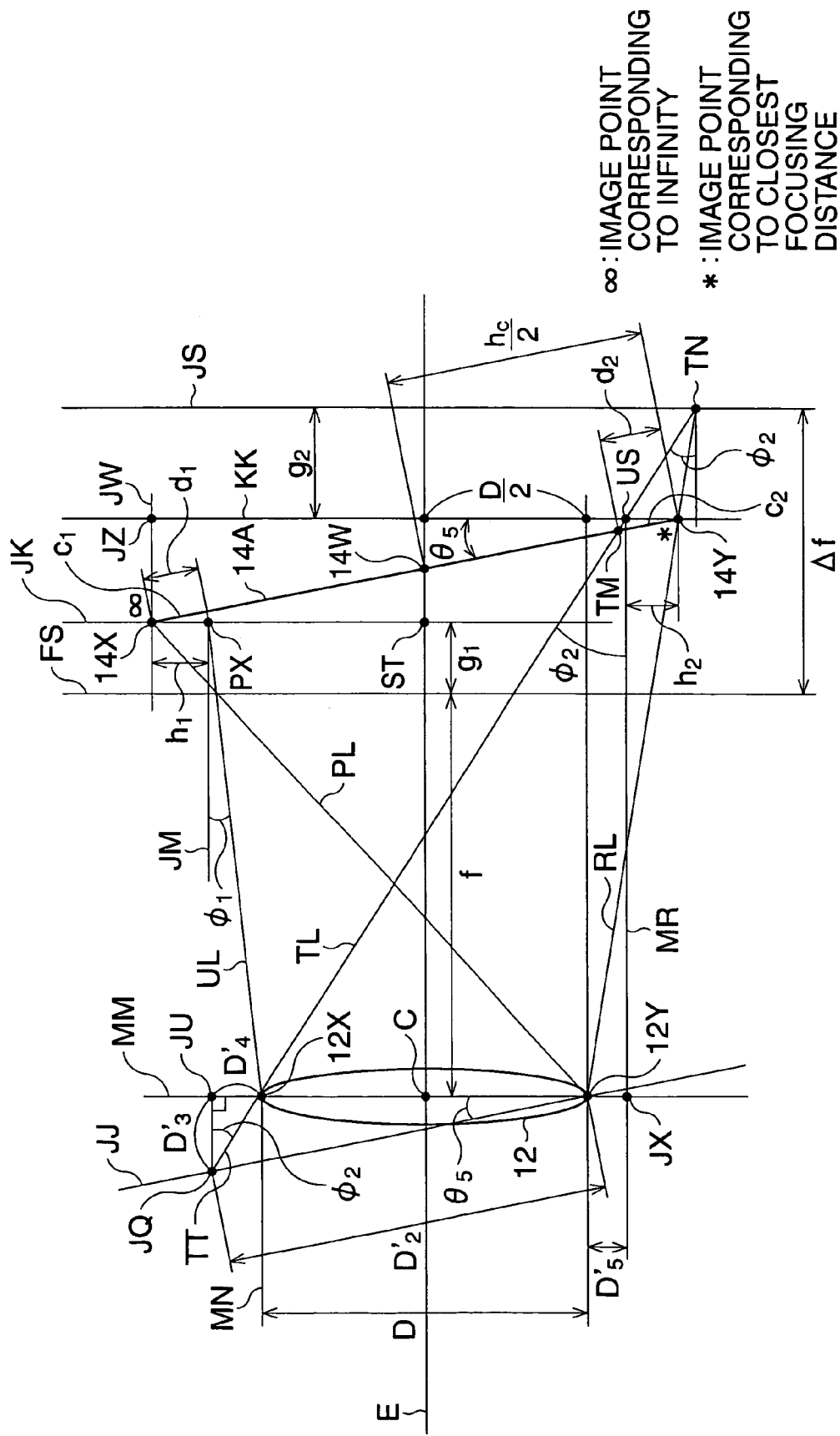
FIG. 14 is a view showing an arrangement of a CCD according to the seventh embodiment.

With reference to FIG. 14, an imaging device according to the seventh embodiment is explained. In the seventh embodiment, the radius of the circle of confusion formed at the upper end point is the same as that of the circle of confusion formed at the lower endpoint. Other constructions of the imaging device are the same as those of the fifth embodiment shown in FIGS. 11 to 13.

FIG. 14 is a view showing an arrangement of the CCD 14 according to the seventh embodiment. When the radius "$d_1$" of the circle of confusion "$c_1$", corresponding to the first end point 14X, is equal to the radius "d2" of the circle of confusion "$c_2$", corresponding to the second end point 14Y, the center 14W of the photo-receiving area 14A does not coincide with a point distant from the focal plane FS by Δf/2, which is different from the first to fourth embodiments. Herein, the distance from a cross point "ST", which is a cross point of a straight line JK passing through the first end point 14Y and the optical axis E, to the focal plane FS is designated by "$g_1$". Then, the distance from a straight line KK, which passes through the second end point 14Y and is vertical to the optical axis E, to the straight line JS, which includes the image-point of an object at the closed focusing distance, is designated by "$g_2$". Further, an inclined angle of the photo-receiving area 14A is designated by "$\theta_5$", an angle between the upper limit ray UL directed toward the first end point 14X and the straight line JM is designated by "$\phi_1$", and an angle between the upper limit ray TL directed toward the second end point 14Y and the optical axis E is designated by "$\phi_2$".

On the other hand, a cross point of a straight line "JJ" parallel to the photo-receiving area 14A and the straight line "TT", which extends from the upper limit point 12X along the upper limit ray TL, is designated by "JQ". Then, the distance from the lower limit point 12Y to the cross point JQ is designated by "$D'_2$", and the distance from the principle plane MM to the cross point JQ is designated by "$D'_3$", and the distance from a straight line MN, which passes through the upper limit point 12X and is parallel to the optical axis E, to the cross point JQ is designated by "$D'_4$". Further, when a cross point of the upper limit ray TL and the straight line KK is designated by "US", and a straight line, which passes through the cross point US and which is parallel to the optical axis E, is designated by "MR", the distance from the straight line MR to the lower limit point 12Y is herein designated by "$D'_5$".

When a cross point of the upper limit ray TL and the photo-receiving area 14A is designated by "TM", and an image-point of an object of the closest focusing distance on the straight line JS is designated by "TN", the triangle composed of vertices "TN", "TM", "14Y" is similar to the triangle composed of vertices "TN", "JQ", "12Y". Therefore, the following formula is $$d_2 : D'_2 = g_2 : (f + \Delta f) \quad (30)$$

The radius "$d_2$" is calculated by the following formula.

$$d_2 = g_2 D'_2/(f+\Delta f) \quad (31)$$

On the other hand, when a point, which passes through the principle plane MM and which is distant from the upper limit point 12X by the distance "$D'_4$", is designated by "JU", based on the triangle composed of "12Y", "JQ", "JU", the following formula is satisfied.

$$D'_2 \cos\theta_5 = D + D'_4 = D + D'_2 \sin\theta_5 \times \tan\phi_2 \quad (32)$$

Based on the formula (32), the distance "$D'_2$" is obtained by the following formula.

$$D'_2 = D/(\cos\theta_5 - \sin\theta_5 \times \tan\phi_2) \quad (33)$$

The radius "$d_2$" is calculated by substituting the formula (33) for the formula (31) as follows.

$$d_2 = g_2/(f+\Delta f) \times D/(\cos\theta_5 - \sin\theta_5 \times \tan\phi_2) \quad (34)$$

When the distance from the point US and the second end point 14Y is designated by "$h_2$", since the triangle composed of vertices "TN", "US", "14Y" is similar to the triangle of composed of vertices "TN", "12X", "12Y", the following formula is satisfied.

$$h_2 : D = g_2 : (f+\Delta f) \quad (35)$$

Therefore, the distance "$h_2$" is obtained as follows.

$$h_2 = g_2 D/(f+\Delta f) \quad (36)$$

When the cross point of the principle plane MM and the straight line MR is designated by "JX", based on the triangle composed of vertices "US", "JX", "12X", the following formula is satisfied.

$$\tan\phi_2 = (D+D'_5)/(f+\Delta f - g_2) \quad (37)$$

On the other hand, the distance "$D'_5$" is obtained by the following formula.

$$D'_5 = (h_c/2)\cos\theta_5 - D/2 - h_2 \quad (38)$$

Therefore, the following formula is obtained by substituting the formulae (36) and (38) for the formula (37)

$$\tan\phi_2 = ((h_c/2)\cos\theta_5 - g_2 D/(f+\Delta f) + D/2)/(f+\Delta f - g_2) \quad (39)$$

When a cross point of a straight line JW, which passes through the first end point 14X and is parallel to the optical axis E, and the straight line KK is designated by "JZ", based on the triangle composed of vertices "14Y", "14X", "JZ", the following formula is obtained.

$$h_c \sin\theta_5 = \Delta f - g_1 - g_2 \quad (40)$$

On the other hand, in accordance with the formulae (15) and (22) shown in the third and fourth embodiments, the distance "$d_1$" and the angle "$\phi_1$" are obtained by the following formulae.

$$d_1 = (g_1 D/f) \times 1/(\sin\theta_5 \times \tan\phi_1 + \cos\theta_5) \quad (41)$$

$$\tan\phi_1 = ((h_c/2) \times \cos\theta_5 - g_1 D/f - D/2)/(f+g_1) \quad (42)$$

Further, as described above, the following formula is satisfied.

$$d_1 = d_2 \quad (43)$$

Therefore, the inclined angle "$\theta_5$" that satisfies the formulae (34), (39), (40), (41), (42), and (43) is obtained as a minimum inclined angle that makes the radiuses "$d_1$" and "$d_2$" radiuses that are less than that of the permissible circle of confusion. Note, the formula for obtaining the inclined angle "$\theta_5$" is not represented.

Figure 15:
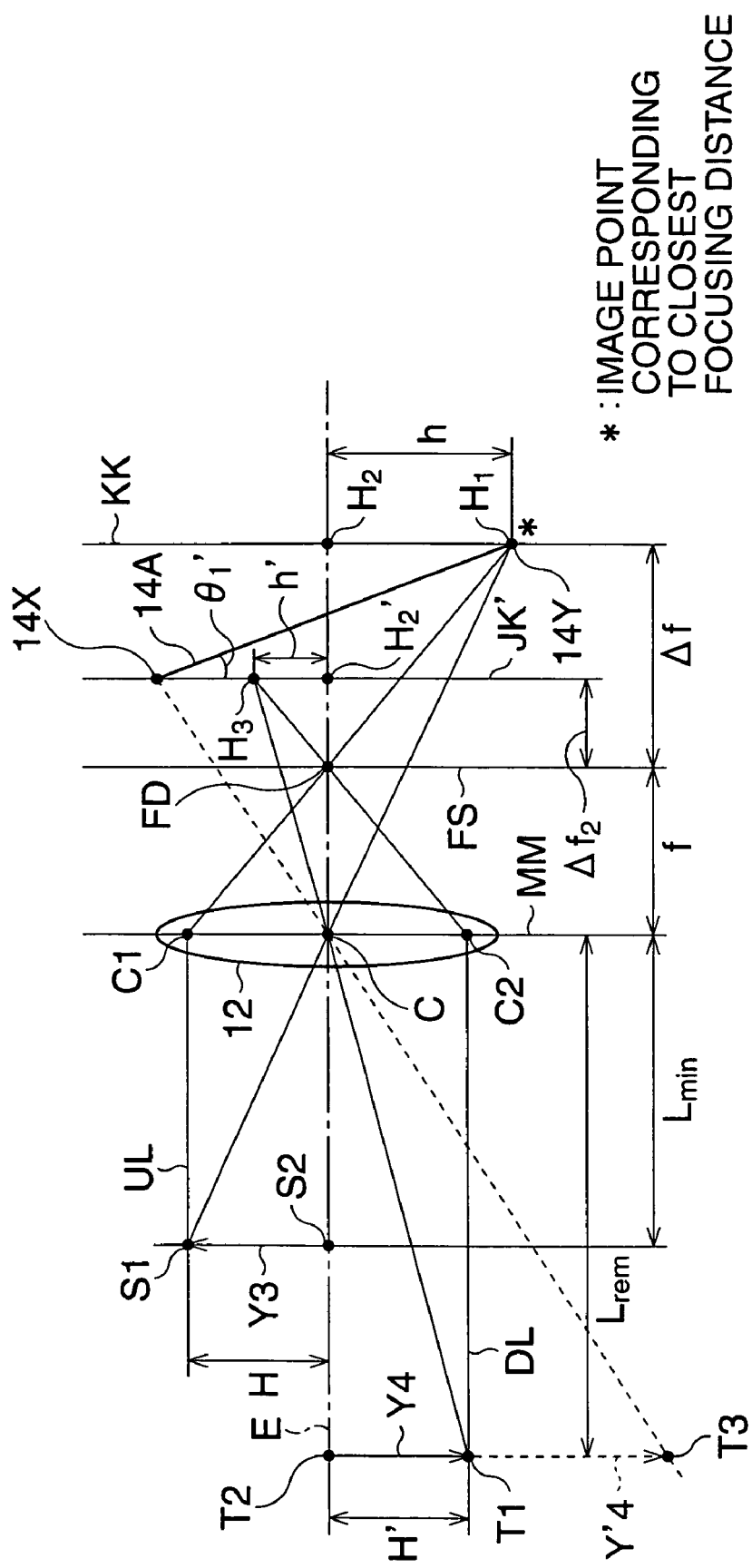
FIG. 15 is a view showing an arrangement of a CCD according to the eighth embodiment.

With reference to FIG. 15, an imaging device according to the eighth embodiment is explained. In the eighth embodiment, the inclined angle is calculated in accordance with an object at the remote distance (not infinity), which is different from the third embodiment. Note that, the circle of confusion is not considered when obtaining the minimum inclined angle condition. Other constructions are the same as those according to the third embodiment.

FIG. 15 is a view showing an arrangement of the CCD according to the eighth embodiment. The height of an object Y4 from the optical axis E is designated by "H'", the top point of the object Y4 is designated by "T1", the cross point of the object Y4 and the optical axis E is designated by "T2", a straight line, which passes through the first end point 14X and which is vertical to the optical axis E, is designated by "JK'", an image-point of the top point T1 on the straight line JK' is designated by "$H_3$", the distance from the optical axis E to the image point $H_3$ is designated by "h'", a cross point of the principle plane MM and the lower limit ray DL of the object Y4 is designated by "C2". Further, the distance from the focal plane FS to the first end point 14X along the optical axis E is designated by "$\Delta f_2$", the inclined angle of the CCD 14 is designated by "$\theta_1$'". The remote shooting area is designated by "$L_{rem}$", which indicates a distance from the principle plane MM where an image of the object Y4 is formed on the straight line JK'.

Similarly to the third embodiment, the triangle composed of vertices "C", "S1", "S2" is similar to the triangle composed of vertices "C", "H1", "H2", and the triangle composed of vertices "C", "C1", "FD" is similar to the triangle composed of vertices "H2", "H1", "FD". Therefore, the following formulae are satisfied.

$$H/L_{min} = h/(f+\Delta f) \quad (44)$$

$$H/f = h/\Delta f \quad (45)$$

Based on the formulae (44) and (45), the following formula is obtained.

$$\Delta f = f^2/(L_{min} - f) \quad (46)$$

On the other hand, when a cross point of the straight line JK'and the optical axis E is designated by "$H_2$'", since the triangle composed of vertices "C", "T1", "T2" is similar to the triangle composed of vertices "C", "$H_3$", "$H_2$'", the following formula is obtained.

$$H'/L_{rem} = h'/(f+\Delta f_2) \quad (47)$$

Further, since the triangle composed of vertices "C", "C2", "FD" is similar to the triangle composed of vertices "$H_2$'", "$H_3$", "FD", the following formula is obtained.

$$H'/f = h'/\Delta f_2 \quad (48)$$

Based on the formulae (47) and (48), the following formula is obtained.

$$\Delta f_2 = f^2/(L_{rem} - f) \quad (49)$$

Then, similarly to the formula (4), the inclined angle "$\theta_1$'" satisfies the following formula.

$$\sin\theta_1' = (\Delta f - \Delta f_2)/h_c \quad (50)$$

Based on the formula (50), the inclined angle "$\theta_1'$" is obtained by the following formula.

$$\theta_1' = \sin^{-1}((\Delta f - \Delta f_2)/h_c) \quad (51)$$
$$= \sin^{-1}((1/h_c) \times f^2(1/L_{min} - f) - 1/(L_{rem} - f)))$$

Note that, object Y4' with a top point T3, an image of which is formed on the first end point 14X, is represented by a broken line.

Figure 16:
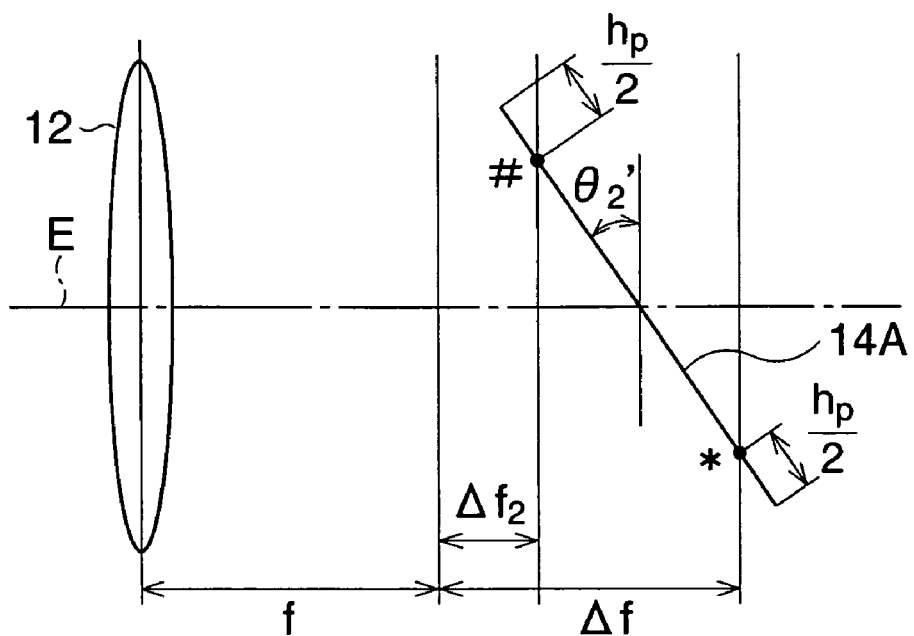
FIG. 16 is a view showing an arrangement of a CCD according to a ninth embodiment.

With reference to FIG. 16, an imaging device according to the ninth embodiment is explained. In the ninth embodiment, an object exists at the remote distance (not infinity), and a center of one extracting area is defined as an image point of an object at the remote distance, which is different from the fourth embodiment shown in FIG. 10. The circle of confusion is not considered. Other constructions are the same as those of the fourth embodiment.

FIG. 16 is a view showing an arrangement of the CCD according to the ninth embodiment. Similarly to the fourth embodiment, the inclined angle "$\theta_2'$" satisfies the following formula.

$$\sin \theta_2' = (\Delta f - \Delta f_2)/(h_c - h_p) \quad (52)$$

Therefore, the inclined angle "$\theta_2'$" is obtained by the following formula.

$$\theta_2' = \sin^{-1}((1/(h_c - h_p)) \times f^2(1/(L_{min} - f) - 1/(L_{rem} - f)))(53)$$

Figure 17:
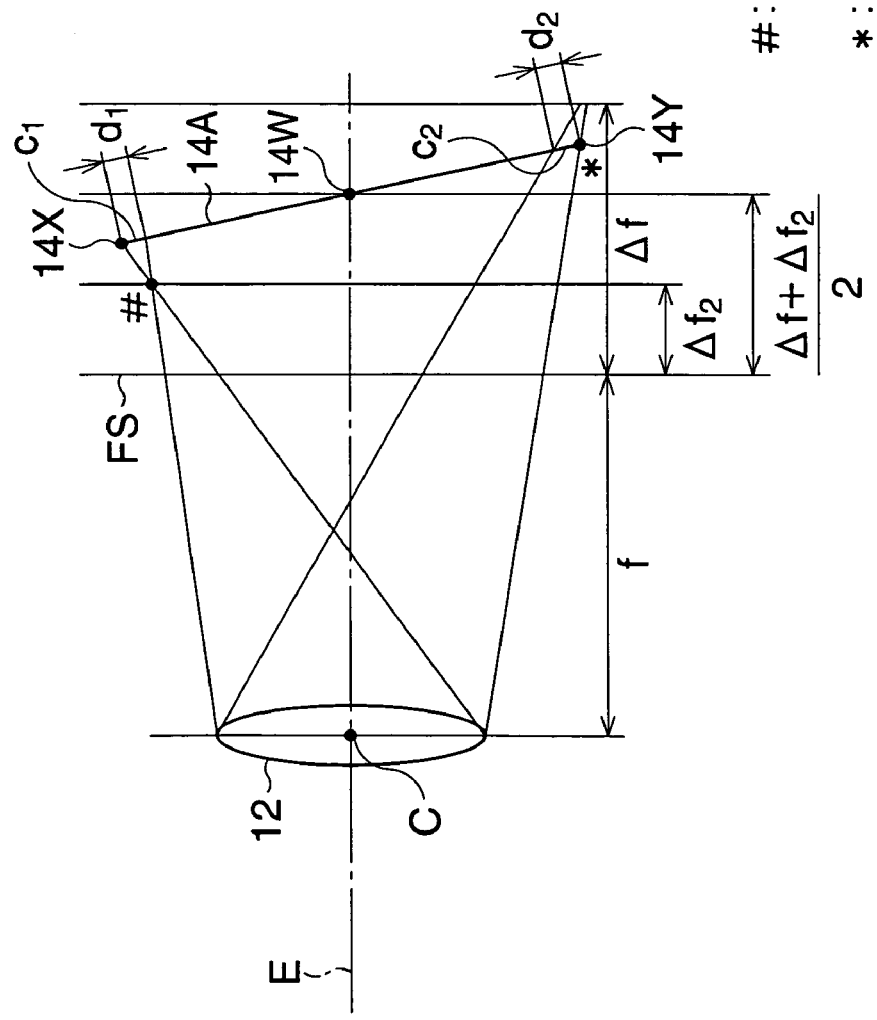
FIG. 17 is a view showing an arrangement of a CCD according to a tenth embodiment.
Figure 18:
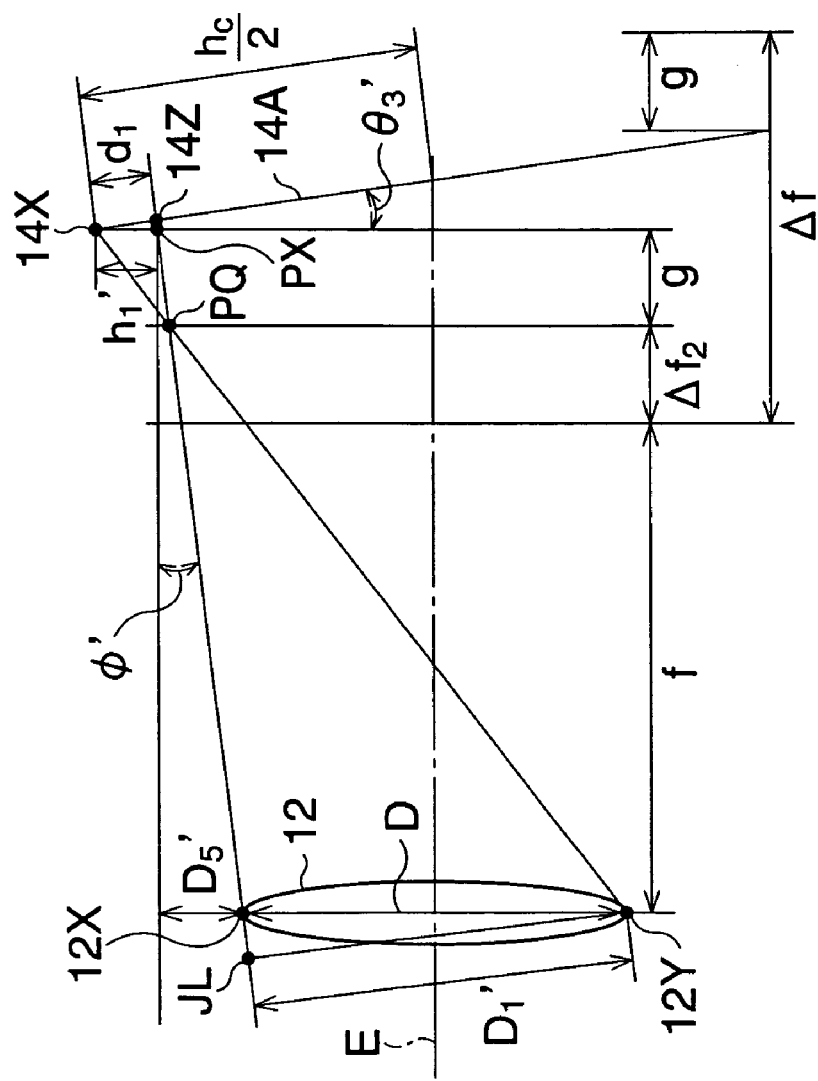
FIG. 18 is a view showing an arrangement of a CCD where the circle of confusion is formed.
Figure 19:
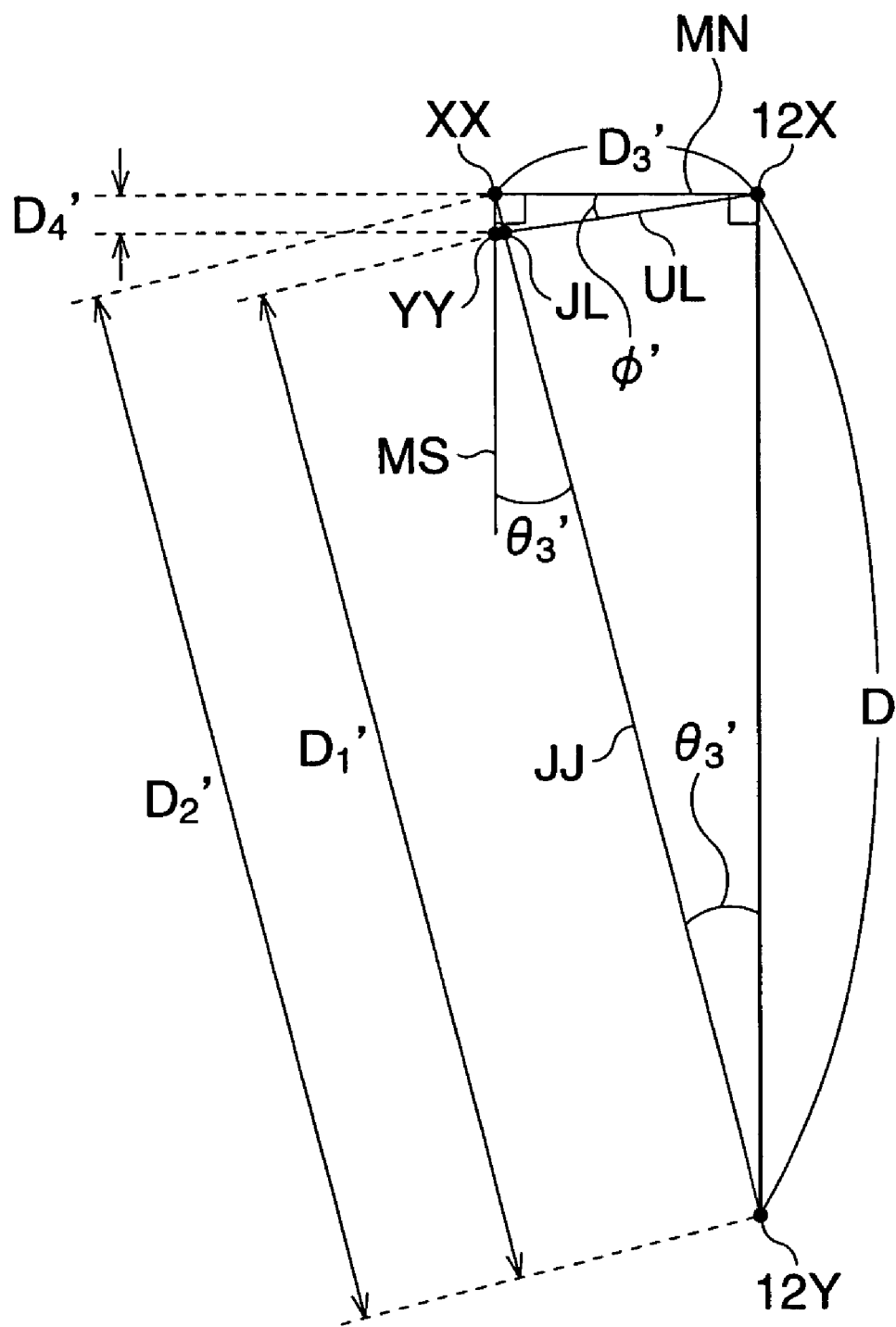
FIG. 19 is a magnified view of the optical photographing system.

With reference to FIGS. 17 to 19, an imaging device according to the tenth embodiment is explained. In the tenth embodiment, the permissible circle of confusion is considered, similarly to the fifth embodiment shown in FIGS. 11 to 13, and an object exists in the remote distance. Note, the image plane of the object at the remote distance is located behind the focal plane FS by a given distance.

FIG. 17 is a view showing an arrangement of the CCD where the circle of confusion is formed on the photo-receiving area. FIG. 18 is a view showing an arrangement of the CCD where the circle of confusion, corresponding to the object at the remote distance, is shown. FIG. 19 is a magnified view of the optical photographing system shown in FIG. 17.

The end points of the photo-receiving area 14 are respectively defined as an image point of an object at the remote distance and an image point of an object at the closest focusing distance. Then, the depth of focus, namely, the permissible circle of confusion is considered.

In FIG. 17, the circle of confusion "$c_1$" is formed near to the first end point 14X and the circle of confusion "$c_2$" is formed near to the second end point 14Y. The CCD 14 is arranged such that the center 14W of the photo-receiving area 14A is positioned away from the focal plane FS along the optical axis E by the distance "$(\Delta f + \Delta f_2)/2$".

Similarly to the fifth embodiment, as the triangle composed of vertices "JL", "12Y", "PQ" is similar to the triangle composed of vertices "14Z", "14X", "PQ", the following formula is obtained.

$$d_1 : D_1' = g : (f + \Delta f_2) \quad (54)$$

Note that, reference numerals "$D_1'$, $D_2'$, $D_3'$, $D_4'$, $D_5'$" are herein used in place of reference numerals "$D'_1$, $D'_2$, $D'_3$, $D'_4$, $D'_5$". Based on the formula (54), the radius "$d_1$" of the circle of confusion "$c_1$" is obtained by the following formula.

$$d_1 = g/(f + \Delta f_2) \times D_1' \quad (55)$$

Further, similarly to fifth embodiment, the following formulae are satisfied.

$$D_2' = D/\cos \theta_3' \quad (56)$$
$$D_3' = D \tan \theta_3' \quad (57)$$
$$D_4' = D_3' \tan \phi' \quad (58)$$

As the triangle composed of vertices "JL", "XX", "YY" is similar to the triangle composed of vertices "JL", "12Y", "12X", the following formula is satisfied.

$$D : D_4' = D_1' : (D_2' - D_1') \quad (59)$$

Based on the formulae (58) and (59), the distance "$D_1'$" is obtained by the following formula.

$$D_1' = D/(\sin \theta_3' \times \tan \phi' + \cos \theta_3') \quad (60)$$

By substituting the formula (60) for the formula (55), the radius "$d_1$" is obtained as follows.

$$d_1 = (gD/(f + \Delta f_2)) \times 1/(\sin \theta_3' \times \tan \phi' + \cos \theta_3') \quad (61)$$

Similarly to the fifth embodiment, since the triangle composed of vertices "PQ", "1Y", "12X" is similar to the triangle composed of vertices "PQ", "14X", "PX", the following formula is satisfied.

$$h_1' : D = g : (f + \Delta f_2) \quad (62)$$

Further, the height "$h_1$" and the angle "$\tan \phi'$" are obtained by the following formulae.

$$h_1' = (g/(f + \Delta f_2)) \times D \quad (63)$$
$$\tan \phi' = D_5'/(f + \Delta f_2 + g) \quad (64)$$

Then, similarly to the fifth embodiment, the distance "$D_5'$" and the angle "$\tan \phi'$" are obtained by the following formulae.

$$D_5' = (h_c/2) \times \cos \theta_3' - h_1 - D/2 \quad (65)$$
$$\tan \phi' = ((h_c/2) \times \cos \theta_3' - gD/(f + \Delta f_2) \times D/2)/(f + \Delta f_2 + g) \quad (66)$$

Based on the formula (66), the following formula is obtained.

$$\sin \theta_3' \times (h_c/2 \times \cos \theta_3' - gD/(f + \Delta f_2) - D/2)/(f + \Delta f_2 + g) + \cos \theta_3' = gD/(f + \Delta f_2)d_1 \quad (67)$$

On the other hand, the distance "g", "$\Delta f$", and "$\Delta f_2$" satisfies the following formula.

$$g = (\Delta f - \Delta f_2 - h_c \sin \theta_3')/2 \quad (68)$$

Therefore, the following formula is obtained.

$$K' + L' = M' \quad (69)$$

Note, $$K' = ((D/(f + \Delta f_2) \times d_1) \times g^2$$

$$L' = ((1/d_1 + \sin \theta_3'/(f + \Delta f_2)) \times D - \cos \theta_3') \times g$$

$$M' = \sin \theta_3' (h_c \cos \theta_3' - D)/2 + (f + \Delta f_2) \cos \theta_3'$$

Then, based on the formula (26), the inclined angle "$\theta_3'$" is calculated as follows.

$$\theta_3' = \sin^{-1}(N'/O') \tag{70}$$

Note, $$N' = ((\Delta f - \Delta f_2)/2 - d_1(f+\Delta f)/D)(2f+\Delta f+\Delta f_2)$$

$$O' = (h_c - d_1)(f+\Delta f)$$

For example, when the imaging device is applied to an electronic endoscope, the effective length "$h_c$" of the photo-receiving area 14A is 5.4 mm, the focus distance "f" is 4.0 mm, the maximum remote distance "$L_{rem}$" is 50.0 mm, the closest focusing distance "$L_{min}$" is 10.0 mm, the F. Number of the optical photographing system "f/D" is 8.0, the maximum value of the radius "$d_1$" of the circle of confusion, namely, the radius of the permissible circle of confusion is 0.009 mm, and the inclined angle "$\theta_3'$" is obtained by the formula (71).

$$\theta_3' = 18.58° \tag{71}$$

Next, the eleventh embodiment is explained without a figure. In the eleventh embodiment, similarly to the sixth embodiment, extracting areas are defined on the photo-receiving area, and the inclined angle is calculated in a condition where the center of one extracting area corresponds to the unfocused image of the closest focusing distance. Other constructions are the same as those of the tenth embodiment.

Similarly to the sixth embodiment, the inclined angle "$\theta_4'$" is obtained by using "$(h_c - h_p)$" in place of "$h_c$".

$$\theta_4' = \sin^{-1}(N''/O'') \tag{72}$$

Note, $$N'' = ((\Delta f - \Delta f_2)/2 - d_1(f+\Delta f)/D)(2f+\Delta f+\Delta f_2))$$

$$O'' = ((h_c - h_p - d_1)(f+\Delta f))$$

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2004-001909 (filed on Jan. 7, 2004), which is expressly incorporated herein, by reference, in its entirety.

The invention claimed is:

1. An electronic apparatus with an imaging device, comprising:
   a photographing optical system that forms an object image,
   an image pick-up device that has a photo-receiving area and generates image-pixel signals from the object image formed on the photo-receiving area, the photo-receiving area being inclined relative to a direction perpendicular to an optical axis by a given angle;
   an extracting processor that detects an image of an object to be focused and defines a focus area on a basis of the detected image, the focus area including an image of an object to be photographed in the entire objective image formed on the photo receiving area; and extracts the focus area of the object image from the entire object image formed on the photo receiving area as focused-image data on the basis of the image-pixel signals;
   a recording processor that records the focused-image data in a memory; and
   a displaying processor that displays a focused-image on a display in accordance with the focused-image data.

2. The electronic apparatus of claim 1, wherein said extracting processor defines a first area for forming an image of a relatively distant object, and a second area for forming an image of a relatively close object,
   wherein said extracting processor selectively extracts one of a first object image formed on the first area and a second object image formed on the second area.

3. The electronic apparatus of claim 1, wherein said extracting processor defines a remote distance area, a close distance area, and a middle distance area,
   wherein the remote distance area is located at one side of said photo-receiving area, is defined for forming an image of a relatively distant object or an object at infinity, and is relatively close to said photographing optical system along the optical axis,
   wherein the close distance area is located at another side of said photo-receiving area, is defined for forming an image of an object, which is relatively close to a closest focusing distance, and is relatively distant from said photographing optical system along the optical axis,
   wherein the middle distance area is located between the close distance area and the remote distance area, and includes the center point of said photo-receiving area,
   wherein said extracting processor selectively extracts an object image formed one of the close, remote, and middle distance areas as the focused image data.

4. An imaging device comprising:
   a photographing optical system that forms an object image,
   an image pick-up device that has a photo-receiving area and generates image-pixel signals from the object image formed on said photo-receiving area, said photo-receiving area being inclined relative to a direction perpendicular to an optical axis by a given angle; and
   an extracting processor that detects an image of an object to be focused and defines a focus area on a basis of the detected image, the focus area including an image of an object to be photographed in the entire objective image formed on the photo receiving area, and extracts the focus area of the object image from the entire object image formed on the photo receiving area as focused-image data on the basis of the image-pixel signals.

5. A method for imaging comprising:
   inclining an image pick-up device with a photo-receiving area relative to a direction perpendicular to an optical axis of a photographing optical system by a given angle;
   producing image-pixel signals from an object image formed on the photo-receiving area, the photo-receiving area being inclined relative to a direction perpendicular to the optical axis;
   detecting an image of an object to be focused:
   defining a focus area on a basis of the detected image, the focus area including an image of an object to be photographed in the entire objective image formed on the photo receiving area; and
   extracting the focus area of the object image from the entire object image formed on the photo receiving area as focused-image data on the basis of the image-pixel signals.

6. An imaging device comprising:
   a photographing optical system that forms an object image; and
   an image pick-up device that has a photo-receiving area and generates image-pixel signals from the object image formed on said photo-receiving area,
   wherein said photo-receiving area of said image pick-up device is inclined relative to a direction perpendicular to an optical axis by a given angle, such that one end portion of said photo-receiving area corresponds to an image-point of an object at infinity or a remote distance, and the other end portion of said photo-receiving area corresponds to an image-point of an object at a closest focusing distance;
   wherein one end portion of said photo-receiving area corresponds to the image-point of the object at the remote distance, and the photo-receiving area is inclined by an angle that is equal to or more than an angle satisfying the following equation, $$\theta'_1 = \sin^{-1}((\Delta f - \Delta f_2)/h_c)$$
$$= \sin^{-1}((1/h_c) \times f^2(1/L_{\min} - f) - 1/(L_{rem} - f)))$$

where "$\theta_1$'" is the inclined angle, "f" is a focus distance, $\Delta f = f^2/(L_{min}-f)$, "$h_c$" is the effective length of said photo-receiving area, "$L_{min}$" indicates a distance from a position of the closest focusing distance to a principle point of said photographing optical system, and "$L_{rem}$" indicates a distance from a position of an object at the remote distance to a principle point of said photographing optical system.

7. An imaging device comprising:
   a photographing optical system that forms an object image; and
   an image pick-up device that has a photo-receiving area and generates image-pixel signals from the object image formed on said photo-receiving area,
   wherein said photo-receiving area of said image pick-up device is inclined relative to a direction perpendicular to an optical axis by a given angle, such that one end portion of said photo-receiving area corresponds to an image-point of an object at infinity or a remote distance, and the other end portion of said photo-receiving area corresponds to an image-point of an object at a closest focusing distance;
   wherein one end portion of said photo-receiving area corresponds to the image-point of the object at infinity, and the photo-receiving area is inclined by an angle that is equal to or more than an angle satisfying the following equation, $$\theta_1 = \sin^{-1}(\Delta f / h_c)$$
$$= \sin^{-1}((1/h_c) \times f^2/(L_{\min} - f))$$

where "$\theta_1$" is the inclined angle, "f" is a focus distance, $\Delta f = f^2/(L_{min}-f)$, "$h_c$" is the effective length of said photo-receiving area, and "$L_{min}$" indicates a distance from a position of the closest focusing distance to a principle point of said photographing optical system.

8. An imaging device comprising:
   a photographing optical system that forms an object image; and
   an image pick-up device that has a photo-receiving area and generates image-pixel signals from the object image formed on said photo-receiving area, said photo-receiving area being inclined relative to a direction perpendicular to an optical axis by a given angle,
   wherein a first image area is defined in one end portion relatively distant from said optical photographing system along an optical axis, and a second image area is defined in the other end portion relatively close to said photographing optical system, said first image area being defined for focusing an image of an object at infinity or a remote distance, said second image area being defined for focusing an image of an object at a close distance,
   wherein a center of the first image area corresponds to the image point of the object at infinity or the remote distance, and a center of the second image area corresponds to the image point of an object at a closest focusing distance;
   wherein the first image area is defined for the object at infinity, and the center of the first image area corresponds to an image-point of the object at infinity, and the photo-receiving area is inclined by an angle that is equal to or more than an angle satisfying the following equation, $$\theta_2 = \sin^{-1}(\Delta f / (h_c - h_p))$$
$$= \sin^{-1}(1/(h_c - h_p) \times f^2/(L_{\min} - f))$$

where "$\theta_2$" is the inclined angle, "f" is a focus distance, $\Delta f = f^2/(L_{min}-f)$, "$h_c$" is the effective length of said photo-receiving area, "$h_p$" is a length of the first and second image area, and "$L_{min}$" indicates a distance from a position of the closest focusing distance to a principle point of said photographing optical system.

9. An image device comprising:
   a photographing optical system that forms an object image;
   an image pick-up device that has a photo-receiving area and generates image-pixel signals from the object image formed on said photo-receiving area, said photo-receiving area being inclined relative to a direction perpendicular to an optical axis by a given angle,
   wherein a first image area is defined in one end portion relatively distant from said photographing optical system along an optical axis, and a second image area is defined in the other end portion relatively close to said photographing optical system, said first image area being defined for focusing an image of an object at infinity or a remote distance, said second image area being defined for focusing an image of an object at a close distance,
   wherein a center of the first image area corresponds to the image point of the object at infinity or the remote distance, and a center of the second image area corresponds to the image point of an object at a closest focusing distance;
   wherein the first image area is defined for the object at the remote distance, and the center of the first image area corresponds to an image-point of the object at the remote distance, and the photo-receiving area is inclined by an angle that is equal to or more than an angle satisfying the following equation, $$\theta_2' = \sin^{-1}((1/(h_c-h_p)) \times f^2(1/(L_{min}-f) - 1/(L_{rem}-f)))$$

where "$\theta_2$" is the inclined angle, "f" is a focus distance, $\Delta f=f^2/(L_{min}-f)$, "$h_c$" is the effective length of said photo-receiving area, "$h_p$" is a length of the first and second image area, "$L_{min}$" indicates a distance from a position of the closest focusing distance to a principle point of said photographing optical system, and "$L_{rem}$" indicates a distance from a position of an object at the remote distance to a principle point of said photographing optical system.

10. An imaging device comprising:
   a photographing optical system that forms an object image; and
   an image pick-up device that has a photo-receiving area and generates image-pixel signals from the object image formed on said photo-receiving area, said photo-receiving area being inclined relative to a direction perpendicular to an optical axis by a given angle;
   wherein one end portion of said photo-receiving area corresponds to an image-point of an object at infinity or a remote distance, and the other end portion of said photo-receiving area corresponds to an image-point of an object at a closest focusing distance
   wherein the photo-receiving area is inclined such that a circle of confusion formed at the one end portion has a radius equal to or less than that of a permissible circle of confusion;
   wherein one end portion of said photo-receiving area corresponds to the image-point of the object at infinity, and the photo-receiving area is inclined by an angle that is equal to or more than an angle satisfying the following equation, $$\theta_3=\sin^{-1}((\Delta f/2-d_1 f/D)(2f+\Delta f)/((h_c-d_1)(f+\Delta f)))$$

where "$\theta_3$" is the inclined angle, "f" is a focus distance, $\Delta f=f^2/(L_{min}-f)$, "$h_c$" is the effective length of said photo-receiving area, "D" is the effective length of said photographing optical system, "$d_1$" is a radius of the permissible circle of confusion, and "$L_{min}$" indicates a distance from a position of the closest focusing distance to a principle point of said photographing optical system.

11. An image device comprising:
   a photographing optical system that forms an object image;
   an image pick-up device that has a photo-receiving area and generates image-pixel signals from the object image formed on said photo-receiving area, said photo-receiving area being inclined relative to a direction perpendicular to an optical axis by a given angle;
   wherein one end portion of said photo-receiving area corresponds to an image-point of an object at infinity or a remote distance, and the other end portion of said photo-receiving area corresponds to an image-point of an object at a closest focusing distance,
   wherein the photo-receiving area is inclined such that a circle of confusion formed at the one end portion has a radius equal to or less than that of a permissible circle of confusion;
   wherein one end portion of said photo-receiving area corresponds to the image-point of the object at the remote distance, and the photo-receiving area is inclined by an angle that is equal to or more than an angle satisfying the following equation, $$\theta_3'=\sin^{-1}(((\Delta f-\Delta f_2)/2-d_1(f+\Delta f)/D)(2f+\Delta f+\Delta f_2)/(h_c-d_1)(f+\Delta f)))$$

where "$\theta_3'$" is the inclined angle, "f" is a focus distance, $\Delta f=f^2/(L_{min}-f)$, $\Delta f_2=f^2/(L_{rem}-f)$, "$h_c$" is the effective length of said photo-receiving area, "D" is the effective length of said photographing optical system, "$d_1$" is a radius of the permissible circle of confusion, "$L_{min}$" indicates a distance from a position of the closest focusing distance to a principle point of said photographing optical system, and "$L_{rem}$" indicates a distance from a position of an object at the remote distance to a principle point of said photographing optical system.

12. An imaging device comprising:
   a photographing optical system that forms an object image; and
   an image pick-up device that has a photo-receiving area and generates image-pixel signals from the object image formed on said photo-receiving area, said photo-receiving area being inclined relative to a direction perpendicular to an optical axis by a given angle,
   wherein a first image area is defined in one end portion relatively distant from said photographing optical system along an optical axis, and a second image area is defined in the other end portion relatively close to said photographing optical system, said first image area being defined for focusing an image of an object at infinity or a remote distance, said second image area being defined for focusing an image of an object at a close distance,
   wherein a center of the first image area corresponds to the image point of the object at infinity or the remote distance, and a center of the second image area corresponds to the image point of an object at a closest focusing distance,
   wherein the photo-receiving area is inclined such that a circle of confusion formed at the first image area has a radius equal to or less than that of a permissible circle of confusion;
   wherein the first image area is defined for the object at the remote distance, and the center of the first image area corresponds to an image-point of the object at the remote distance, and the photo-receiving area is inclined by an angle that is equal to or more than an angle satisfying the following equation, $$\theta_4'=\sin^{-1}(((\Delta f-\Delta f_2)/2-d_1(f+\Delta f)/D)(2f+\Delta f+\Delta f_2))/((h_c-h_p-d_1)(f+\Delta f)))$$

where "$\theta_4'$" is the inclined angle, "f" is a focus distance, $\Delta f=f^2/(L_{min}-f)$, $\Delta f_2=f^2/(L_{rem}-f)$, "$h_c$" is the effective length of said photo-receiving area, "$h_p$" is a length of the first and second image area, "D" is the effective length of said photographing optical system, "$d_1$" is a radius of the permissible circle of confusion, "$L_{min}$" indicates a distance from a position of the closest focusing distance to a principle point of said photographing optical system, "$L_{rem}$" indicates a distance from a position of an object at the remote distance to a principle point of said photographing optical system.

13. An imaging device comprising:
   a photographing optical system that forms an object image;
   an image pick-up device that has a photo-receiving area and generates image-pixel signals from the object image formed on said photo-receiving area, said photo-receiving area being inclined relative to a direction perpendicular to an optical axis by a given angle,
   wherein a first image area is defined in one end portion relatively distant from said photographing optical system along an optical axis, and a second image area is defined in the other end portion relatively close to said optical photographing system, said first image area being defined for focusing an image of an object at infinity or a remote distance, said second image area being defined for focusing an image of an object at a close distance, wherein a center of the first image area corresponds to the image point of the object at infinity or the remote distance, and a center of the second image area corresponds to the image point of an object at a closest focusing distance, wherein the photo-receiving area is inclined such that a circle of confusion formed at the first image area has a radius equal to or less than that of a permissible circle of confusion;

wherein the first image area is defined for the object at infinity, and the center of the first image area corresponds to an image-point of the object at infinity, and the photo-receiving area is inclined by an angle that is equal to or more than an angle satisfying the following equation, $$\theta_4 = \sin^{-1}(((\Delta f/2 - d_1 f/D)(2f + \Delta f))/((h_c - h_p - d_1)(f + \Delta f)))$$

where "$\theta_4$" is the inclined angle, "f" is a focus distance, $\Delta f = f^2/(L_{min} - f)$, "$h_c$" is the effective length of said photo-receiving area, "$h_p$" is a length of the first and second image area, "D" is the effective length of said photographing optical system, "$d_1$" is a radius of the permissible circle of confusion, and "$L_{min}$" indicates a distance from a position of the closest focusing distance to a principle point of said photographing optical system.

14. An imaging device comprising:

a photographing optical system that forms an object image; and an image pick-up device that has a photo-receiving area and generates image-pixel signals from the object image formed on said photo-receiving area, said photo-receiving area being inclined relative to a direction perpendicular to an optical axis by a predetermined angle;

wherein one end portion of said photo-receiving area corresponds to an image-point of an object at infinity or a remote distance, and the other end portion of said photo-receiving area corresponds to an image-point of an object at a closest focusing distance, wherein the photo-receiving area is inclined such that radii of circles of confusion formed at each of the end portions are equal radius and the radius is equal to or less than a radius of a permissible circle of confusion wherein the predetermined angle of the photo receiving area, $\theta_5$, is defined by the following relationships:

$$d_2 = g_2/(f + \Delta f) \times D/(\cos\theta_5 - \sin\theta_5 \times \tan\phi_2)$$

$$\tan\phi_2 = ((h_c/2)\cos\theta_5 - g_2 D/(f + \Delta f) + D/2)/(f + \Delta f - g_2)$$

$$h_c \sin\theta_5 = \Delta f - g_1 - g_2$$

$$d_1 = (g_1 D/f) \times 1/(\sin\theta_5 \times \tan\phi_1 + \cos\theta_5)$$

$$\tan\phi_1 = ((h_c/2) \times \cos\theta_5 - g_1 D/f - D/2)/(f + g_1)$$

where $d_1$ represents a radius of a circle of confusion corresponding to the first end portion;

$d_2$ represents a radius of the circle of confusion corresponding to the second end portion;

$g_1$ represents a distance between a focal plane and a line perpendicular to the optical axis and passing through the first end portion;

$g_2$ represents a distance between a line perpendicular to the optical axis and passing through the second end point and a line perpendicular to the optical axis and passing through the image point of an object at the closest focusing distance;

f represents the focal distance;

$\Delta f = f^2/L_{min} - f$, where $L_{min}$ represents a distance from a closest focusing distance to a principle point of the photographing optical system;

D represents an effective lens of the photographing optical system;

$h_c$ represents an effective length of the photo receiving area;

$\phi_1$ represents an angle between an upper limit ray directed towards the first end portion and the optical axis of the photographing optical system; and $\phi_2$ represents an angle between an upper limit ray directed towards the second end portion and the optical axis of the photographing optical system.

* * * * *